(12) United States Patent
Kim et al.

(10) Patent No.: US 10,165,479 B2
(45) Date of Patent: Dec. 25, 2018

(54) METHOD AND APPARATUS FOR PERFORMING HANDOVER OF CARRIER AGGREGATION MOBILE STATION

(71) Applicant: Samsung Electronics Co., Ltd., Suwon-si, Gyeonggi-do (KR)

(72) Inventors: Wook Kim, Seoul (KR); Hyo-Joon Kim, Suwon-si (KR); Joong-Keun Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 386 days.

(21) Appl. No.: 14/620,374

(22) Filed: Feb. 12, 2015

(65) Prior Publication Data
US 2015/0237541 A1 Aug. 20, 2015

(30) Foreign Application Priority Data

Feb. 18, 2014 (KR) .................. 10-2014-0018498
Jul. 4, 2014 (KR) .................. 10-2014-0083571

(51) Int. Cl.
*H04W 36/00* (2009.01)
*H04W 24/10* (2009.01)
*H04W 72/04* (2009.01)

(52) U.S. Cl.
CPC ....... *H04W 36/0055* (2013.01); *H04W 24/10* (2013.01); *H04W 36/0083* (2013.01); *H04W 36/0088* (2013.01); *H04W 72/0453* (2013.01); *H04W 36/0094* (2013.01)

(58) Field of Classification Search
CPC ............ H04W 36/0055; H04W 24/10; H04W 72/0453; H04W 36/0088; H04W 36/0083; H04W 36/0094
See application file for complete search history.

(56) References Cited

U.S. PATENT DOCUMENTS

| | | | |
|---|---|---|---|
| 2011/0275374 A1 | 11/2011 | Narasimha et al. | |
| 2013/0010763 A1* | 1/2013 | Chen | H04L 5/001 370/331 |
| 2013/0100931 A1 | 4/2013 | Kim | |
| 2013/0215772 A1* | 8/2013 | Kaur | H04W 36/0072 370/252 |
| 2015/0092746 A1* | 4/2015 | Jang | H04W 24/08 370/331 |
| 2016/0014666 A1* | 1/2016 | Muller | H04W 36/30 455/436 |
| 2016/0157120 A1* | 6/2016 | Shi | H04W 24/10 370/252 |

* cited by examiner

*Primary Examiner* — Kwang B Yao
*Assistant Examiner* — Moo Jeong
(74) *Attorney, Agent, or Firm* — Jefferson IP Law, LLP

(57) ABSTRACT

A method of a base station (BS) of a carrier aggregation (CA) is provided. The method includes determining whether a mobile station (MS) concurrently uses a first cell associated with a first carrier frequency and a second cell associated with a second carrier frequency, and controlling a handover of the MS using a measurement configuration set corresponding to a result of the determination among a plurality of measurement configuration sets that are set for each of handover related events.

20 Claims, 10 Drawing Sheets

METHOD AND APPARATUS FOR PERFORMING HANDOVER OF CARRIER AGGREGATION MOBILE STATION

CROSS-REFERENCE TO RELATED APPLICATION(S)

This application claims the benefit under 35 U.S.C. § 119(a) of a Korean patent application filed on Feb. 18, 2014 in the Korean Intellectual Property Office and assigned Serial number 10-2014-0018498, and a Korean patent application filed on Jul. 4, 2014 in the Korean Intellectual Property Office and assigned Serial number 10-2014-0083571, the entire disclosure of each of which is hereby incorporated by reference.

TECHNICAL FIELD

The present disclosure relates to a method and apparatus for performing handover of a carrier aggregation mobile station (CA MS).

BACKGROUND

With the increased popularity of mobile terminals, data traffic has been increasing. In order to support the increased data traffic, a carrier aggregation mobile station (CA MS) concurrently using a primary cell (P cell) and a secondary cell (S cell), each using a different carrier frequency, has been provided. CA is a service suitable to MSs that heavily rely upon data traffic. Particularly, the Release 10 TS36.300 Annex. J introduces various scenarios applicable to the CA MS.

For example, a co-located scenario of maximizing a data throughput by superposing frequency zones of a P cell and an S cell has been suggested. However, making the frequency zones of the P cell and S cell coincident with each other is merely an ideal scenario and, in reality, it is difficult to perfectly make the frequency zones of the P cell and the S cell coincident with each other. To make the inconsistent frequency zones of the P cell and the S cell coincident with each other, much time is required. Although much time is spent and the frequency zones of the P cell and the S cell are adjusted, it is almost impossible to make the two frequency zones physically perfectly coincident with each other.

If the frequency zones of the P cell and the S cell do not coincide with each other, a situation may occur in which, because a CA MS supporting CA receives a weaker signal than a non-CA MS not supporting CA, the CA MS has a lower data throughput than the non-CA MS.

For example in the related art, as illustrated in FIG. 1, in a situation in which the frequency zones of the P cell and S cell do not coincide with each other, the CA MS may use a P1 cell as the P cell, and use a B cell as the S cell. At this time, the P cell and the S cell may be in a state of being previously matched in a form of P0 and A, P1 and B, and P2 and C by the co-located scenario. The CA MS in the illustrated position performs no handover, because signal reception from the B cell being the S cell is almost impossible and a received signal strength from the P1 cell being the P cell is not as weak as the CA MS. That is, it may not be possible for the CA MS in the illustrated position to receive a signal from the B cell in a state where a signal reception condition of the P1 cell is not so good, whereas the non-CA MS in the same position may perform handover to the C cell and receive a strong signal from the C cell. As a result, a situation may occur in which the CA MS has a worse signal transmission/reception efficiency than the non-CA MS.

In accordance with this, there is a need to provide a technology in which the CA MS using all of the P cell and the S cell can more rapidly perform a handover to a cell of a good channel condition, so as to always maintain a higher data rate than the non-CA MS.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for performing handover in consideration of all channel conditions of a primary cell (P cell) and a secondary cell (S cell) that are being currently accessed in a carrier aggregation mobile station (CA MS) using all of the P cell and the S cell.

Another aspect of the present disclosure is to provide a method and apparatus for performing handover to a cell having a better channel condition than a P cell within an S cell frequency zone, although not satisfying a handover event condition defined in the legacy handover standard under the circumstances of a middle electric field or less of the P cell that is being currently accessed in a CA MS using all of the P cell and the S cell.

Another aspect of the present disclosure is to provide a method and apparatus for additionally setting up a measurement report set for handover of a CA MS to each handover related event in a base station (BS).

In accordance with an aspect of the present disclosure, a method of a BS of a CA system is provided. The method includes determining whether an MS concurrently uses a first cell associated with a first carrier frequency and a second cell associated with a second carrier frequency, and controlling a handover of the MS using a measurement configuration set corresponding to a result of the determination among a plurality of measurement configuration sets that are previously set up by handover related event.

In accordance with another aspect of the present disclosure, a method of an MS of a CA system is provided. The method includes receiving a measurement configuration set dependent on whether the MS concurrently uses a first cell associated with a first carrier frequency and a second cell associated with a second carrier frequency, and detecting and reporting an occurrence or a non-occurrence of a corresponding handover related event based on the received measurement configuration set.

In accordance with another aspect of the present disclosure, a BS of a CA system is provided. The BS includes a transceiver configured to transmit/receive a signal with the MS, a storage unit configured to store a plurality of measurement configuration sets that are previously set up by handover related event, and a control unit configured to determine whether the MS concurrently uses a first cell associated with a first carrier frequency and a second cell associated with a second carrier frequency, and to control a handover of the MS using a measurement configuration set corresponding to a result of the determination among the plurality of measurement configuration sets that are set for each of handover related events.

In accordance with another aspect of the present disclosure, an MS of a CA system is provided. The MS includes a transceiver configured to transmit/receive a signal, and a control unit configured to receive a measurement configuration set dependent on whether the MS concurrently uses a first cell associated with a first carrier frequency and a second cell associated with a second carrier frequency, and to detect and report an occurrence or a non-occurrence of a corresponding handover related event based on the received measurement configuration set.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
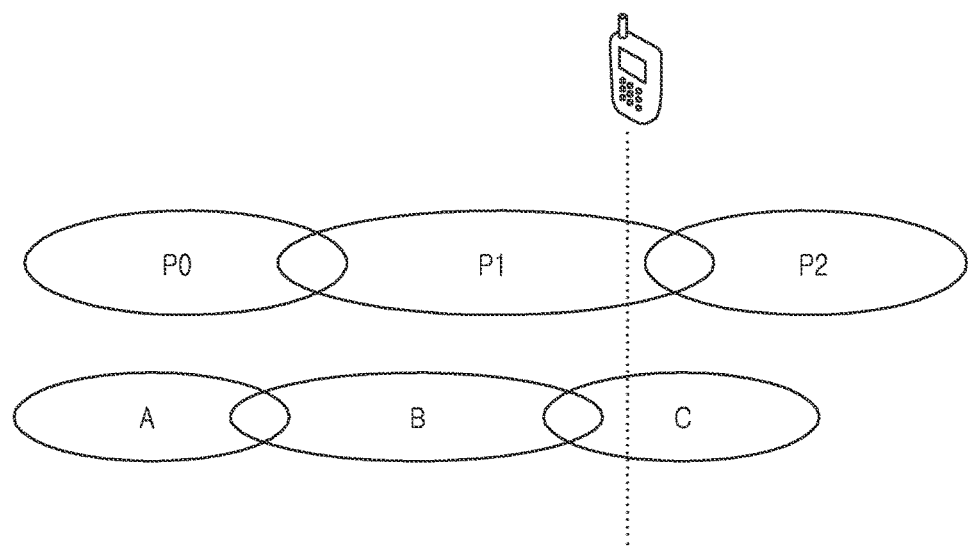
FIG. 1 is a diagram illustrating a handover situation dependent on a position of a mobile station (MS) supporting carrier aggregation (CA) according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expressions such as "have," "can have," "comprise," "can comprise," or the like in the various embodiments of the present disclosure indicate the existence of disclosed corresponding functions, operations, constituent elements or the like, and do not intend to limit additional one or more functions, operations, constituent elements or the like. Also, in various embodiments of the present disclosure, it should be understood that the terms such as "comprise," "have," or the like indicate the existence of a feature stated in the specification, a number, an operation, a constituent element, a component, or a combination thereof, and do not intend to previously exclude a possibility of existence or supplement of one or more other features, numbers, operations, constituent elements, components, or combinations thereof.

The expressions such as "A or B," "at least one of A or/and B," or the like in the various embodiments of the present disclosure include any and all combinations of words enumerated together. For example, the "A or B" or "at least one of A or/and B" each may include A, may include B, or may also include all A and B.

The expressions such as "$1^{st}$, $2^{nd}$," "first," "second" or the like in the various embodiments of the present disclosure may modify various constituent elements of various embodiments the present disclosure, but do not intend to limit the corresponding constituent elements. For example, the expressions do not limit the order and/or importance and the like of the corresponding constituent elements. The expressions may be used to distinguish one constituent element from another constituent element. For example, all of a 1st user device and a 2nd user device are user devices, and represent different user devices. For example, a 1st constituent element may be named as a 2nd constituent element without departing from the scope of right of various embodiments of the present disclosure. Likely, even a 2nd constituent element may be named as a 1st constituent element.

When it is mentioned that any constituent element is "connected" or "accessed" to another constituent element, it should be understood that the any constituent element may be directly connected or accessed to the another constituent element or the third constituent element may also exist between the any constituent element and the another constituent element. In contrast, when it is mentioned that any constituent element is "directly connected" or "directly accessed" to another constituent element, it should be understood that the third constituent element does not exist between the any constituent element and the another constituent element.

The expression "configured (or set) to" used in the present disclosure may be used interchangeably with, for example, "suitable for," "having the capacity to," "designed to," "adapted to," "made to," or "capable of," in accordance with the surrounding circumstances. The term "configured (or set) to" may not necessarily mean only "specifically designed to" in a hardware manner. Instead, in some circumstances, the expression "device configured to" may mean that the device "is able to ~" together with other devices or components. For example, the clause "processor configured (or set) to perform A, B, and C" may mean a dedicated processor (e.g., an embedded processor) for performing a corresponding operation, or a generic-purpose processor (e.g., a central processing unit (CPU) or an application processor) executing one or more software programs stored in a memory device, thereby being capable of performing corresponding operations.

The terms used in various embodiments of the present disclosure are used for just describing specific embodiments, and do not intend to limit the various embodiments of the present disclosure.

Unless defined otherwise, all the terms used herein including the technological or scientific terms have the same meaning as those commonly understood by a person having ordinary knowledge in the art to which various embodiments of the present disclosure belong. The terms as defined in a general dictionary should be interpreted as having the same meanings as the contextual meanings of a related technology, and are not interpreted as having ideal or excessively formal meanings unless defined clearly in various embodiments of the present disclosure.

Also, the present specification describes aiming at a wireless communication network. Work fulfilled in the wireless communication network may be fulfilled in a process of controlling the wireless communication network and transmitting data in a system (for example, a base station (BS)) controlling over the wireless communication network or the work may be fulfilled in a mobile station (MS) accessed to the wireless communication network.

A wireless communication system according to an embodiment of the present disclosure includes a plurality of BSs. Each BS provides a communication service for a specific geographical area (commonly called a cell). The cell may be divided into a plurality of regions (or sectors).

An MS may be fixed or may have mobility, and may be called other terms such as user equipment (UE), a mobile terminal (MT), a user terminal (UT), a subscriber station (SS), a wireless device, a personal digital assistant (PDA), a wireless modem, a handheld device and the like.

Generally, the BS refers to a fixed station communicating with the MS, and may be called other terms such as an evolved-Node B (eNB), a base transceiver system (BTS), an access point (AP) and the like. The cell should be interpreted as a comprehensive meaning indicating a partial region covered with the BS, and is a meaning containing all of various coverage regions such as a mega cell, a macro cell, a micro cell, a pico cell, a femto cell and the like. Below, a method and apparatus for performing handover of a carrier aggregation (CA) MS will be described.

FIG. 1 is a diagram illustrating a handover situation dependent on a position of a MS supporting CA according to the related art.

Here, the CA MS represents a user terminal concurrently using a primary cell (P cell) and a secondary cell (S cell) each using a different carrier frequency. For example, as illustrated in FIG. 1, the CA MS may represent a user terminal concurrently using a P0 cell and an A cell each using a different carrier frequency or concurrently using a P1 cell and a B cell each using a different carrier frequency.

According to an embodiment of the present disclosure, to improve a data transmission/reception throughput of an MS supporting CA, the MS supporting CA is processed to perform a handover to another cell of an S cell frequency zone having a better channel condition under the circumstances of a middle electric field or less of a P cell. For this, the embodiment of the present disclosure uses a handover related event defined in the handover standard according to the related art and a measurement configuration set (or a measurement condition) of the handover related event as they are, and additionally sets up a measurement configuration set for CA MS of each event.

For example, to detect the occurrence of each of handover related events A1, A2, A3, and A5, the related art sets up one measurement configuration set of each of the handover related events A1, A2, A3, and A5, whereas the embodiment of the present disclosure sets up additional measurement configuration sets for detecting each of the handover related events A1, A2, A3, and A5. In other words, in the embodiment of the present disclosure, a plurality of measurement configuration sets may be set up by event. Here, the measurement configuration set may include a measurement identification (ID). The measurement ID includes a measurement object ID representing information about a frequency intended to be measured and a report configuration ID representing corresponding event and threshold value and/or threshold offset information.

Also, the event A1 may take place when a signal strength of a serving cell is greater than a threshold value included in an A1 measurement configuration set, and the event A2 may take place when the signal strength of the serving cell is less than a threshold value included in an A2 measurement configuration set, and the event A3 may take place when a signal strength of an adjacent cell is greater than the signal strength of the serving cell by a threshold offset value or more included in an A3 measurement configuration set, and the event A5 may take place when the signal strength of the serving cell is less than a 1st threshold value included in an A5 measurement configuration set and the signal strength of the adjacent cell is greater than a 2nd threshold value included in the A5 measurement configuration set. In the embodiment of the present disclosure, the handover related event is a meaning including a measurement report related event. In the following description, the handover related event may be stated as a measurement report related event or an event.

As described above, in the embodiment of the present disclosure, a plurality of measurement configuration sets may be set up by a measurement report related event. For one example, two measurement configuration sets may be set up for the event A2 as described in Table 1 and Table 2 below. To distinguish an event occurring by the legacy measurement configuration set and an event occurring by a measurement configuration set that is additionally set for the sake of a CA MS in accordance with an embodiment of the present disclosure, the event occurring by the legacy measurement configuration set is denoted as "A#" and the event occurring by the measurement configuration set for the CA MS is denoted as "A#(CA)" in the following description.

Table 1 below describes a measurement configuration set of an event A2, and Table 2 below describes a measurement configuration set of an event A2(CA).

TABLE 1

| measurement id(MeasId) | 100 | |
|---|---|---|
| measurement object id(measObjectId) | 200 | measObjectEUTRA carrierFreq:800MHz : |
| report config id(report ConfigId) | 300 | reportConfigEUTRA eventA2 threshold-RSRP: 1000 threshold-RSRQ: 2000 |

TABLE 2

| measurement id(MeasId) | 110 | |
|---|---|---|
| measurement object id(measObjectId) | 200 | measObjectEUTRA carrierFreq:800MHz : |
| report config id(report ConfigId) | 310 | reportConfigEUTRA eventA2 threshold-RSRP: 3000 threshold-RSRQ: 4000 |

Tables 1 and 2 describe two measurement configuration sets that all have to measure a carrier frequency of 800 Mega Hertz (MHz). Also, Tables 1 and 2 all describe that the event A2 occurs when a corresponding threshold value is satisfied. However, the event A2 of Table 1 has a threshold value of a received signal strength of 1000 and a threshold value of a received signal quality of 2000, and the event A2(CA) of Table 2 has a threshold value of a received signal strength of 3000 and a threshold value of a received signal quality of 4000. That is, the event A2 and the event A2(CA) are merely different from each other with regards to threshold values, and signify the substantially same measurement report related event A2.

The relationship between a threshold value and an offset value included in each of measurement configuration sets of an event A# and an event A#(CA) is presented as in Table 3 below.

TABLE 3

| Kind of event | Threshold value relationship |
|---|---|
| Event A1: Serving becomes better than absolute threshold | Thresholdvalue_CA > Thresholdvalue_Legacy |
| Event A2: Serving becomes worse than absolute threshold | Thresholdvalue_CA > Thresholdvalue_Legacy |
| Event A3: Neighbor becomes amount of offset better than PCell | Offset_CA > = Offset Legacy |
| Event A5: PCell becomes worse than absolute threshold1 AND Neighbor better than another absolute threshold2 | A5 Thresholdvalue1_CA > A5 Thresholdvalue1_Legacy A5 Thresholdvalue2_CA > A5 Thresholdvalue2_Legacy |

As described in Table 3, the threshold value and offset of the event A#(CA) according to an embodiment of the present disclosure are set as a value greater than or equal to the threshold value or offset of the corresponding legacy event A#. This is for achieving a CA MS that detects the occurrence of a measurement report related event under the circumstances of a middle electric field or less of a P cell, not a weak electric field, and reports this to a BS and performs a handover, so as to always maintain a channel quality of the P cell at a constant level or more in accordance with an embodiment of the present disclosure, compared to the fact that a legacy MS detects the occurrence of a measurement report related event under the circumstances of the weak electric field of the P cell, and reports this to the BS and performs the handover.

Further, in accordance with an embodiment of the present disclosure, the CA MS may perform a handover to another adjacent cell within an S cell frequency zone having a better channel condition than a P cell under the circumstances of a bad channel condition of a constant level or less of the P cell, so as to maintain a data transmission/reception efficiency of the CA MS at a constant level or more.

Further, the embodiment of the present disclosure defines a measurement report related event for detecting a situation of an occurrence of S cell addition and release and reporting the defined measurement report. For example, the embodiment of the present disclosure defines a measurement report related event in which, when detecting a situation of S cell release, a CA MS reports an event A2(S) to a BS and, when detecting a situation of S cell addition, the CA MS reports an event A4(S) to the BS. In accordance with the embodiment of the present disclosure, a measurement configuration set of the event A2(S) may include a measurement object ID representing a carrier of an S cell as a measurement object, and a threshold value for determining a threshold value of the release of the S cell, and a measurement configuration set of the event A4(S) may include a measurement object ID representing a carrier of an S cell as a measurement object, and a threshold value for determining a threshold value of the addition of the S cell.

A method and apparatus for processing handover of a CA MS based on a plurality of measurement configuration sets of each measurement report related event will be described below with reference to FIG. 2 to FIG. 7. Specifically, FIGS. 2 through 7, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

Figure 2:
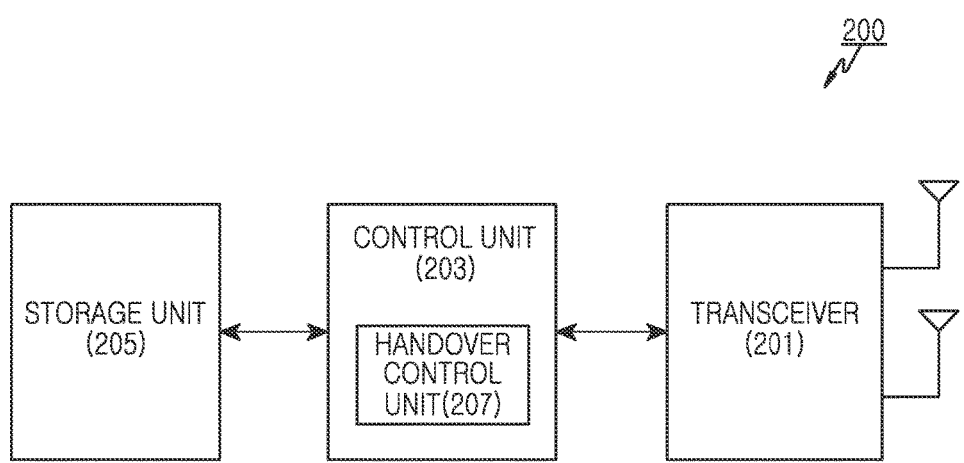
FIG. 2 is a block diagram illustrating a construction of a Base Station (BS) for controlling handover of an MS supporting CA according to an embodiment of the present disclosure.

FIG. 2 is a block diagram illustrating a construction of a BS for controlling handover of an MS supporting CA in a CA system according to an embodiment of the present disclosure.

Referring to FIG. 2, a BS 200 may include a transceiver 201, a control unit 203, and a storage unit 205. The control unit 203 may be called other terms such as a processor, processing unit, and the like.

The transceiver 201 controls and processes a function for transmitting/receiving a signal with an MS. In detail, the transceiver 201 may process a function for transmitting to the MS a message (e.g., a radio resource control (RRC) connection reconfiguration message) including a measurement condition set of a specific measurement report related event by the control of the control unit 203, and receiving a specific measurement report related event occurrence report message from the MS. Also, the transceiver 201 may include a P cell transmission/reception module communicating using a 1st carrier frequency and an S cell transmission/reception module communicating using a 2nd carrier frequency. Also, the transceiver 201 is constructed as one module, but may be also constructed separately as a transmission unit and a reception unit in accordance with a design method.

The control unit 203 controls and processes the general operation of the BS 200 for providing a service to an MS. Particularly, the control unit 203 according to an embodiment of the present disclosure may include a handover control unit 207 and control and processes a function for controlling handover of a CA MS and a non-CA MS. That is, the handover control unit 207 controls and processes a function for determining if an MS is the CA MS concurrently using a P cell and an S cell or if the MS is the non-CA MS using only one serving cell (e.g., the P cell), and setting up a measurement configuration set of a measurement report related event based on whether the MS is the CA MS or the non-CA MS, and transmitting to the MS a message including the set-up measurement configuration set. For example, the handover control unit 207 may also receive information of a cell that is being currently used from the MS gaining access to the BS 200 and check if the MS is the CA MS supporting CA.

Also, the handover control unit 207 controls and process a function for detecting the occurrence of a measurement report related event based on a measurement report message received from an MS, and processing the MS to perform handover in accordance with the measurement report related event or releasing a setting-up of a measurement configuration set of the measurement report related event, and transmitting a message for setting up a measurement configuration set of another measurement report related event.

For example, the handover control unit 207 controls and processes a function for, in a case of a CA MS concurrently using a P cell and an S cell, setting up and transmitting a measurement report set of an event A2(CA) and, in a case of a non-CA MS supporting only one serving cell, setting up and transmitting a measurement report set of an event A2. Further, the handover control unit 207 may control and process a function for, in a case of the CA MS concurrently using the P cell and the S cell, setting up and transmitting a measurement report set of an event A2(S), and reporting that the event A2(S) has occurred when the S cell is released from the CA MS and, in a case of the non-CA MS supporting only one serving cell, setting up and transmitting a measurement report set of an event A4(S), and reporting that the event A4(S) has occurred when the S cell is added to the non-CA MS.

For example, for control of handover of a CA MS, firstly, the handover control unit 207 may transmit to the CA MS an RRC connection reconfiguration message including measurement configuration sets of events A2(CA) and A2(S). Here, the measurement configuration set may include measurement frequency information about a corresponding measurement report related event, and a threshold value. According to an embodiment of the present disclosure, the measurement frequency information included in the measurement configuration set of the event A2(CA) may be set as a carrier frequency of a P cell that the CA MS is accessing, and the measurement frequency information included in the measurement configuration set of the event A2(S) may be set as a carrier frequency of an S cell that the CA MS is accessing. If a measurement report message representing the occurrence of the event A2(CA) is received from the CA MS, then the handover control unit 207 may instruct release of setting-up of the measurement configuration set of the event A2(CA) while transmitting an RRC message including a measurement condition set of each of events A1(CA), A3(CA) and A2 to the CA MS.

For example, the handover control unit 207 may control and process a function for, when the event A2(CA) is reported from the CA MS, determining that the CA MA is at a middle electric field or less of the P cell, and setting up and transmitting a measurement condition set of the event A3(CA) for checking if there is another cell satisfying a handover condition at the middle electric field or less of the P cell, a measurement condition set of the event A1(CA) for detecting a situation in which the CA MS again moves to a strong electric field of the P cell, and a measurement condition set of the event A2 for detecting a situation in which the CA MS moves to a weak electric field of the P cell.

Further, if the event A1(CA) is reported from the CA MS, then the handover control unit 207 may determine that it is a situation in which handover is needless because that the CA MS moves to the strong electric field of the P cell, and release setting-up of measurement configuration sets of the events A1 (CA), A3(CA), and A2, and again transmission process a message for setting up a measurement condition set of the event A2(CA).

Meanwhile, if the event A3(CA) is reported from the CA MS, then the handover control unit 207 may control and process a function for determining that the CA MS discovers an adjacent cell having a better signal strength than the P cell by a threshold value or more in an S cell frequency zone, releasing setting-up of measurement configuration sets of the events A3(CA), A1(CA), A2(S), and A2 and making the CA MS perform handover to the adjacent cell. Meanwhile, if the event A2 is reported from the CA MS, the handover control unit 207 may detect that, when the CA MS is at the middle electric field or less of the P cell, there was no adjacent cell having a better channel condition than the P cell and the CA MS moved to the weak electric field, and release setting-up of the measurement configuration sets of the events A1(CA), A3(CA), A2(S), and A2, and transmission process a message for setting up measurement configuration sets of an event A3 and an event A1.

Meanwhile, if a measurement report message representing the occurrence of the event A2(S) is received from the CA MS, then the handover control unit 207 may determine that the CA MS is changed into a non-CA MS supporting only one serving cell (e.g., the P cell), and instruct release of setting-up of the measurement configuration sets of the events A3(CA), A1(CA), and A2(S) while transmitting to the non-CA MS an RRC message including a measurement report set of the event A4(S) for detecting a situation of addition of the S cell, together with the measurement report set of the event A2.

In another embodiment the present disclosure, if a measurement report message representing the occurrence of an event A2(S) is received from a corresponding CA MA, then the handover control unit 207 may instruct release of setting-up of measurement configuration sets of events A2(CA) and A2(S) while transmitting to the CA MS an RRC message including measurement condition set of each of events A2 and A4(S). For example, if the measurement report message representing the occurrence of the event A2(S) is received from the CA MS, then the handover control unit 207 may determine that the CA MS is changed into a non-CA MS supporting only one serving cell (e.g., the P cell), and transmit to the non-CA MS an RRC message including a measurement report set of the event A4(S) for detecting a situation of addition of an S cell, together with the measurement report set of the event A2.

Further, if a measurement report message representing the occurrence of an event A2 is received from a non-CA MS, then the handover control unit 207 may control and process a function for instructing release of setting-up of measurement configuration sets of events A2 and A4(S) while setting up and transmitting a measurement condition set of an event A1 for detecting a situation in which the non-CA MS moves to a strong electric field of a P cell and a measurement condition set of an event A3 for checking if there is another cell satisfying a handover condition at a weak electric field of the P cell. When the event A1 is reported from the non-CA MS, the handover control unit 207 may transmit a message for determining that it is a situation in which the handover is needless because the non-CA MS moves to the strong electric field of the P cell, releasing setting-up of the measurement configuration sets of the events A1 and A3, and again setting up the measurement configuration sets of the events A2 and A4(S).

Meanwhile, when the event A3 is reported from the non-CA MS, the handover control unit 207 may control and process a function for determining that the non-CA MS discovers an adjacent cell having a better signal strength than the P cell by a threshold value or more, and releasing the setting-up of the measurement configuration sets of the events A1 and A3, and making the non-CA MS perform handover to the discovered adjacent cell. On the other hand, if a measurement report message representing the occurrence of the event A4(S) is received from the non-CA MS, then the handover control unit 207 may determine that the non-CA MS is changed into a CA MS supporting a P cell and an S cell together, and release setting-up of the measurement configuration sets of the events A2 and A4(S), and transmit to the CA MS an RRC message including a measurement report set of the event A2(S) for detecting a situation of release of the S cell.

For another example, if a corresponding MS is a CA MS concurrently using a P cell and an S cell, then the handover control unit 207 may transmit to the CA MS an RRC message including a measurement condition set of each of events A5(CA), A2(S), and A2. For instance, the handover control unit 207 may control and process a function for setting up and transmitting the measurement condition set of the event A5(CA) for checking if there is another cell satisfying a handover condition at a middle electric field or less of the P cell, the measurement condition set of the event A2(S) for checking a situation of release of the S cell, and the measurement condition set of the event A2 for detecting a situation in which the CA MS moves to a weak electric field of the P cell.

Further, if the event A5(CA) is reported from the CA MS, then the handover control unit 207 may control and process a function for determining that a received signal strength from the S cell of the CA MS is less than a threshold value and a received signal strength from an adjacent cell is better than a threshold value or more, and releasing setting-up for the events A5(CA), A2, and A2(S), and making the CA MS perform handover to the adjacent cell. Meanwhile, when the event A2(S) is reported from the CA MS, the handover control unit 207 controls and processes a function for determining that the S cell of the CA MS is released and the CA MS is changed into a non-CA MS, and releasing setting-up for the events A2(S) and A5(CA), and maintaining setting-up for the event A2, and additionally setting up an event A4(S). When the event A2 is reported from the CA MS, the handover control unit 207 controls and processes a function for detecting that, when the CA MS is at a middle electric field of the P cell, there was no adjacent cell having a better channel condition than the P cell and the CA MS moved to the weak electric field of the P cell, and releasing setting-up of the measurement configuration sets of the events A5(CA), A2(S), and A2, and setting up measurement configuration sets of events A5 and A1.

Meanwhile, if a corresponding MS is a non-CA MS using only a P cell as a serving cell, then the handover control unit 207 may transmit to the non-CA MS an RRC message including a measurement condition set of each of events A2 and A4(S). For instance, the handover control unit 207 may control and process a function for setting up and transmitting a measurement condition set of the event A2 for detecting a situation in which the non-CA MS moves to a weak electric field of the P cell, and a measurement condition set of the event A4(S) for detect a situation of addition of an S cell.

When the event A4(S) is reported from the non-CA MS, the handover control unit 207 controls and processes a function for determining that the S cell is added to the non-CA MS and the non-CA MS is changed into a CA MS, and releasing setting-up for the events A2 and A4(S), and setting up and transmitting a measurement condition set of each of events A5(CA), A2(S), and A2. Meanwhile, when the event A2 is reported from the non-CA MS, the handover control unit 207 controls and processes a function for releasing setting-up for the events A2 and A4(S), and setting up and transmitting a measurement report set of an event A5 for checking if there is another P cell satisfying a handover condition at the weak electric field of the P cell, and a measurement report set of an event A1 for detecting a situation in which the non-CA MS moves to a strong electric field of the P cell.

When the event A5 is reported from the non-CA MS, the handover control unit 207 controls and processes a function for releasing setting-up for the events A5 and A1, and making the non-CA MS perform handover to another P cell satisfying a handover condition. Meanwhile, when the event A1 is reported from the non-CA MS, the handover control unit 207 controls and processes a function for releasing setting-up for the events A5 and A1, and setting up a measurement condition set of the event A2 for detecting a situation in which the non-CA MS moves to the weak electric field of the P cell, and a measurement condition set of the event A4(S) for detecting a situation of addition of the S cell The storage unit 205 may store various kinds of data and programs necessary for the operation of the BS 200. In accordance with an embodiment of the present disclosure, the storage unit 205 may store information about a measurement report that is set up by handover related event, i.e., measurement report related event. For example, the storage unit 205 may store two measurement configuration sets of a measurement report related event A2 as described in Tables 1 and 2. Here, a threshold value and/or an offset value included in a measurement configuration set of an event A#(CA) are greater than or are equal to a threshold value and/or an offset value included in a measurement configuration set of a corresponding event A#.

Also, in accordance with an embodiment of the present disclosure, measurement frequency information included in measurement configuration sets of events A3(CA) and A5(CA) may be set as a carrier frequency of an S cell. Also, the storage unit 205 may store information representing if an MS being accessing is a CA MS that is concurrently using a P cell and an S cell or if the MS is a non-CA MS using only the P cell as a serving cell. Also, the storage unit 205 may include measurement configuration sets of events A2(S) and A4(S) for detecting a situation of release and addition of an S cell of the MS. In accordance with an embodiment of the present disclosure, the measurement configuration set of each of the events A2(S) and A4(S) may include at least one of a measurement object ID and a threshold value.

Figure 3:
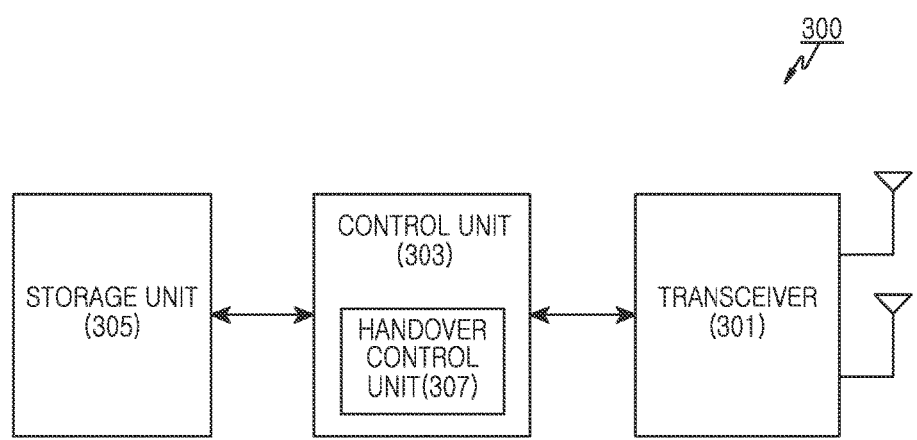
FIG. 3 is a block diagram illustrating a construction of an MS supporting CA according to an embodiment of the present disclosure.

FIG. 3 is a block diagram illustrating a construction of an MS supporting CA according to an embodiment of the present disclosure.

Referring to FIG. 3, an MS 300 may include a transceiver 301, a control unit 303, and a storage unit 305. The control unit 303 may be called other terms such as a processor, processing unit, and the like.

The transceiver 301 controls and processes a function for transmitting/receiving a signal with the BS 200, as illustrated in FIG. 2. In detail, the transceiver 301 may process a function for receiving from the BS 200 a message (e.g., an RRC connection reconfiguration message) including a measurement condition set of a specific measurement report related event by the control of the control unit 303, and transmitting a message (e.g., a measurement report message) of reporting the occurrence of a specific measurement report related event. Also, the transceiver 301 may include a P cell transmission/reception module communicating using a 1st carrier frequency and an S cell transmission/reception module communicating using a 2nd carrier frequency. Also, the transceiver 301 is constructed as one module, but may be also constructed separately as a transmission unit and a reception unit in accordance with a design method.

The control unit 303 controls and processes the general operation of the MS 300 for receiving a communication service from the BS 200. Particularly, the control unit 303, according to an embodiment of the present disclosure, may include a handover control unit 307, and control and process a function for checking a measurement configuration set of a measurement report related event from a message received from the BS 200, and determine the occurrence or non-occurrence of a measurement report related event based on a condition included in the measurement configuration set and, upon the occurrence of the specific measurement report related event, reporting that the measurement report related event has occurred to the BS 200.

For example, the handover control unit 307 checks a measurement configuration set of a specific measurement report related event from an RRC connection reconfiguration message, and checks measurement frequency information and threshold value or offset information in the measurement configuration set. After that, the handover control unit 307 may measure a received signal strength and/or received signal quality of the measurement frequency information and determine whether a condition of the measurement report related event is satisfied through a comparison between the measured value and a threshold value. Here, the measurement frequency information may represent a carrier frequency of a P cell, or may represent a carrier frequency of an S cell. The handover control unit 307 may measure the received signal strength and/or received signal quality of the measurement frequency information, and measure a received signal strength and/or received signal quality of an adjacent cell, and compare the measured values with the threshold value or check if there is as much difference as an offset value between the measured value of the frequency information and the measured value of the adjacent cell and determine the occurrence or non-occurrence of the measurement report related event.

Upon the occurrence of a specific measurement report related event, the handover control unit 307 may report that the measurement report related event has occurred to the BS 200, and release setting-up of a measurement configuration set received through a previous RRC connection reconfiguration message, while receiving an RRC connection reconfiguration message including a measurement configuration set of another measurement report related event, or receiving a message of instructing to perform handover to an adjacent cell.

The storage unit 305 may store various kinds of data and programs necessary for the operation of the MS 300. In accordance with an embodiment of the present disclosure, the storage unit 305 may store information about a measurement configuration set of a measurement report related event received through an RRC connection reconfiguration message from the BS 200. Also, when there is a request for release of setting-up of a measurement configuration set of a specific measurement report related event through an RRC connection reconfiguration message from the BS 200, the storage unit 305 may delete information about the measurement configuration set.

Figure 4A:
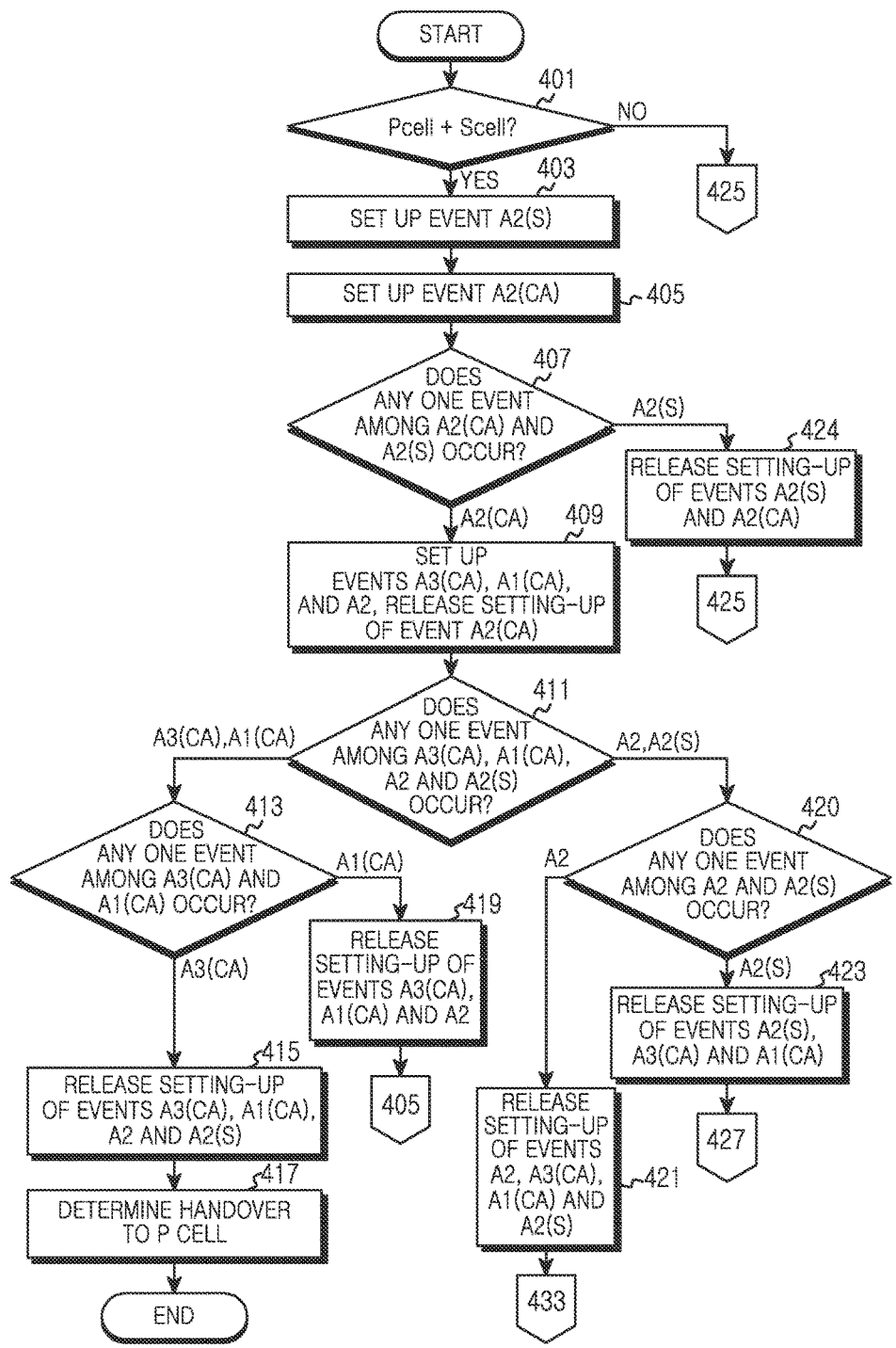
FIGS. 4A and 4B are flowcharts illustrating a procedure of controlling a handover of an MS in a BS according to various embodiments of the present disclosure.
Figure 4B:
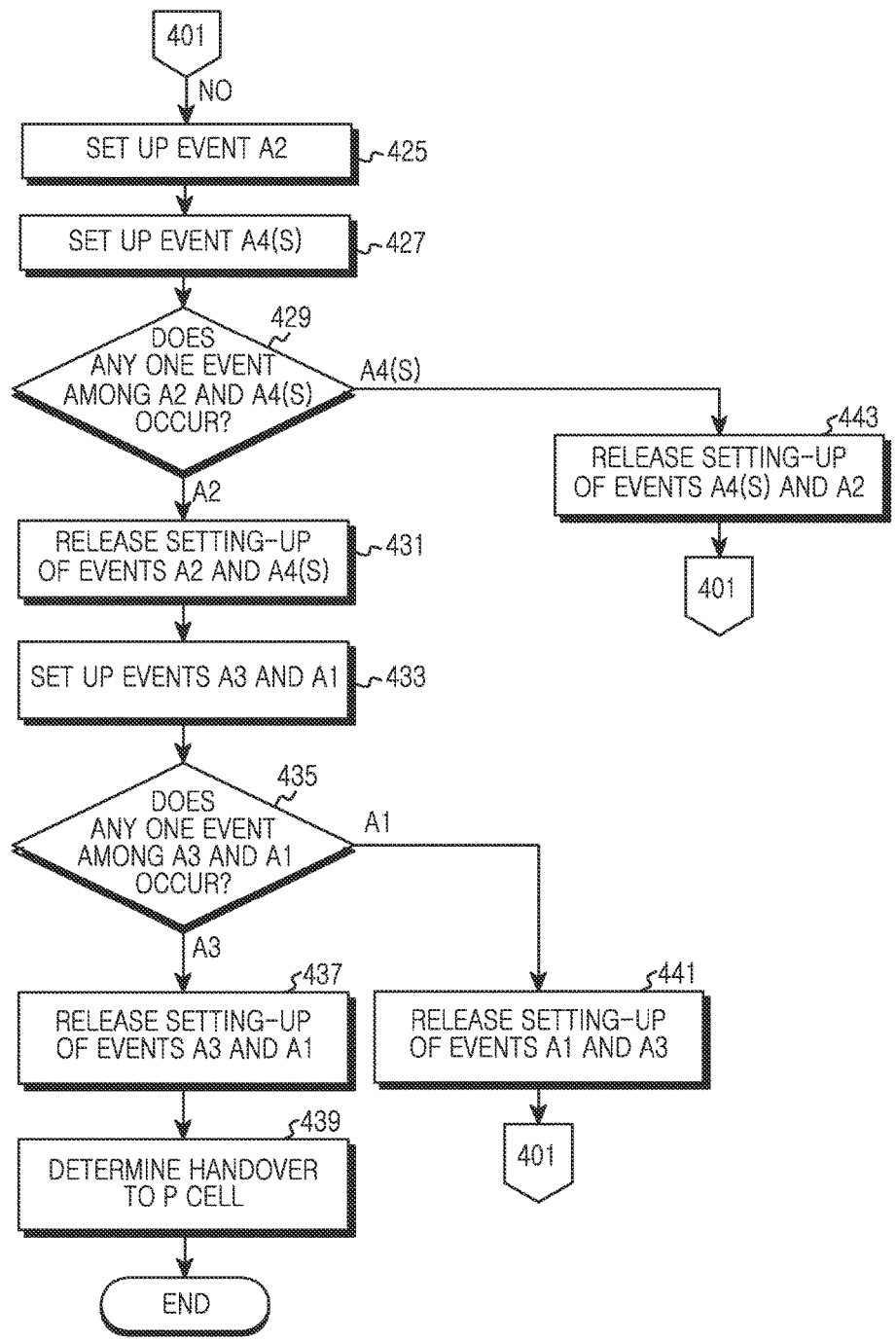

FIGS. 4A and 4B are flowcharts illustrating a procedure of controlling a handover of an MS 300 in a BS 200 according to various embodiments of the present disclosure.

Referring to FIGS. 4A and 4B, in operation 401, a BS 200 checks if an MS 300 concurrently uses a P cell and an S cell. For example, the BS 200 may receive information of a cell that is currently being used from the MS 300, and check if the MS 300 is a CA MS concurrently using the P cell and the S cell or if the MS 300 is a non-CA MS using only the P cell as a serving cell.

If the MS 300 concurrently uses the P cell and the S cell, then the BS 200 sets up an event A2(S) in operation 403 and sets up an event A2(CA) in operation 405. Next, the BS 200 proceeds to operation 407 and checks if any one event among the event A2(CA) and event A2(S) occurs in the MS 300. For example, the BS 200 transmits to the MS 300 an RRC connection reconfiguration message including a measurement configuration set of the event A2(CA) and a measurement configuration set of the event A2(S) for detecting a situation of release of the S cell as described in Table 2, and allows the MS 300 to set up a measurement configuration set representing a condition for detecting the occurrence of the event A2(CA) or the event A2(S), and checks if a measurement report message of reporting the occurrence of any one event among the event A2(CA) and the event A2(S) is received from the MS 300.

If the event A2(CA) occurs in the MS 300 in operation 407, then in operation 409, the BS 200 sets up an event A3(CA), an event A1(CA), and an event A2, and releases setting-up for the event A2(CA). For example, the BS 200 may transmit to the MS 300 an RRC connection reconfiguration message including a measurement configuration set of each of the event A3(CA), the event A1(CA) and the event A2 and requesting release of setting-up of the measurement configuration set of the event A2(CA). At this time, the measurement configuration sets of the event A3(CA), the event A1(CA) and the event (A2) have a carrier frequency of the P cell as a measurement object.

After that, in operation 411, operation 413, and operation 420, the BS 200 checks if any event among the event A3(CA), the event A1(CA), the event A2(S), and the event A2 occurs. In operation 411, operation 413, and operation 420, the BS 200 may check if any event among the event A3(CA), the event A1 (CA), the event A2(S), and the event A2 occurs through a measurement report message received from the MS 300. For convenience, the drawings distinguish and illustrate operation 411, operation 413, and operation 420 in which the BS 200 checks if any event among the event A3(CA), the event A1(CA), the event A2(S), and the event A2 occurs, but it is obvious to those skilled in the art that operation 411, operation 413, and operation 420 may be constructed as one operation.

If it is checked that the event A3(CA) occurs in operation 413, in operation 415, the BS 200 releases setting-up for the event A3(CA), the event A1(CA), the event A2(S), and the event A2. Next, in operation 417, the BS 200 determines a handover using an adjacent cell reported from the MS 300 as a target P cell. For example, when the occurrence of the event A3(CA) is reported from the MS 300, because a received signal strength from the adjacent cell in an S cell frequency zone is greater than a received signal strength of the P cell by an offset value or more in a state in which the MS 300 is positioned at a middle electric field or less of the P cell, the BS 200 predicts that, if the MS 300 performs handover to the adjacent cell, then it may improve a data transmission/reception efficiency of the MS 300 to a constant level or more, and determine to make the MS 300 perform handover to the adjacent cell. At this time, the MS 300 may perform a handover using the adjacent cell as a P cell in accordance with control of the BS 200 and, if an S cell exists and is available, then the MS 300 may use the P cell and the S cell together.

Meanwhile, if it is checked that the event A1(CA) occurs in operation 413, in operation 419, then the BS 200 releases setting-up for the event A3(CA), the event A1(CA), and the event A2, and returns to operation 405. That is, if the occurrence of the event A1(CA) from the MS 300 is detected, then the BS 200 may determine that it is a situation in which a handover is needless because the event A1(CA) is positioned at a strong electric field of the P cell, and again set up an event A2(CA).

On the other hand, if it is checked that the event A2 occurs in operation 420, then in operation 421, the BS 200 releases setting-up for the event A3(CA), the event A1(CA), the event A2(S), and the event A2.

Next, in operation 433, the BS 200 sets up an event A3 for detecting whether there is another P cell whose received signal strength is greater than a received signal strength of the P cell by an threshold offset value or more at a weak electric field of the P cell and an event A1 for detecting that the MS 300 moves to a strong electric field of the P cell, and proceeds to operation 435.

Meanwhile, if it is checked that the event A2(S) occurs in operation 420, then in operation 423, the BS 200 releases setting-up for the event A3(CA), the event A1(CA), and the event A2(S).

Next, in operation 427, the BS 200 sets up an event A4(S) for detecting a situation of addition of an S cell, and proceeds to operation 429.

On the other hand, if the checking result of operation 407 is that the event A2(S) occurs in the MS 300, then the BS 200 determines that the MS 300 is changed into an MS 300 using only the P cell as a serving cell and, in operation 424, the BS 200 releases setting-up for the event A2(S) and the event A2(CA), and goes to operation 425.

If the checking result of operation 401 is that the MS 300 uses the P cell as the serving cell, the BS 200 sets up the event A2 and the event A4(S). For instance, in operation 425, the BS 200 sets up the event A2 for detecting that the MS 300 moves to a weak electric field of the P cell and, in operation 427, the BS 200 sets up the event A4(S) for detecting a situation of addition of the S cell and proceeds to operation 429 and checks if the event A2 occurs in the MS 300. For example, the BS 200 transmits an RRC connection reconfiguration message including a measurement configuration set of the event A2 to the MS 300 as described in Table 1, and allows the MS 300 to set up a measurement configuration set representing a condition for detecting the occurrence of the event A2, and checks if a measurement report message of reporting the occurrence of the event A2 is received from the MS 300.

If it is checked that the event A2 occurs in the MS 300 in operation 429, then in operation 431, the BS 200 releases setting-up for the event A2 and the event A4(S) and, in operation 433, the BS 200 sets up an event A3 and an event A1. For example, the BS 200 may transmit to the MS 300 an RRC connection reconfiguration message including a measurement configuration set of each of the event A3 and the event A1 and requesting release of setting-up of the measurement configuration set of the event A2. At this time, the measurement configuration sets of the events A1 and A3 have a carrier frequency of the P cell (or the cell that the MS is accessing) as a measurement object.

After that, the BS 200 proceeds to operation 435 and checks if any event among the event A3 and the event A1 occurs. Through a measurement report message received from the MS 300, the BS 200 may check if any event among the event A3 and the event A1 occurs. If it is checked that the event A3 occurs in operation 435, then in operation 437, the BS 200 releases setting-up for the event A3 and the event A1.

Next, in operation 439, the BS 200 determines a handover using an adjacent cell reported from the MS 300 as a target P cell. Meanwhile, if it is checked that the event A1 occurs in operation 435, then in operation 441, the BS 200 releases setting-up for the event A3 and the event A1 and returns to operation 401.

If the MS 300 reports the occurrence of the event A4(S) in operation 429, then in operation 443, the BS 200 releases setting-up for the event A2 and the event A4(S), and returns to operation 401.

Figure 5A:
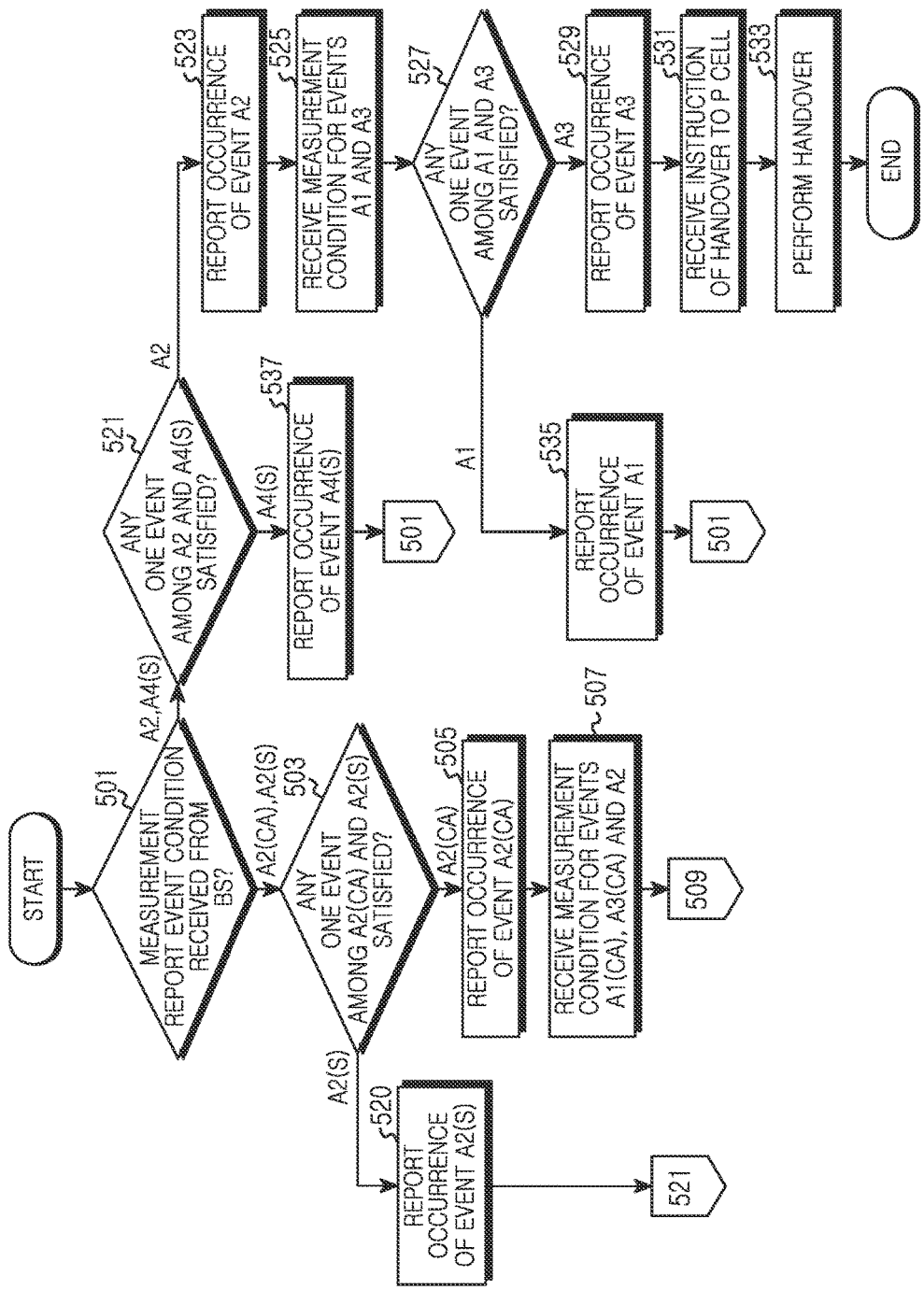
FIGS. 5A and 5B are flowcharts illustrating an operation procedure for a handover in an MS according to various embodiments of the present disclosure.
Figure 5B:
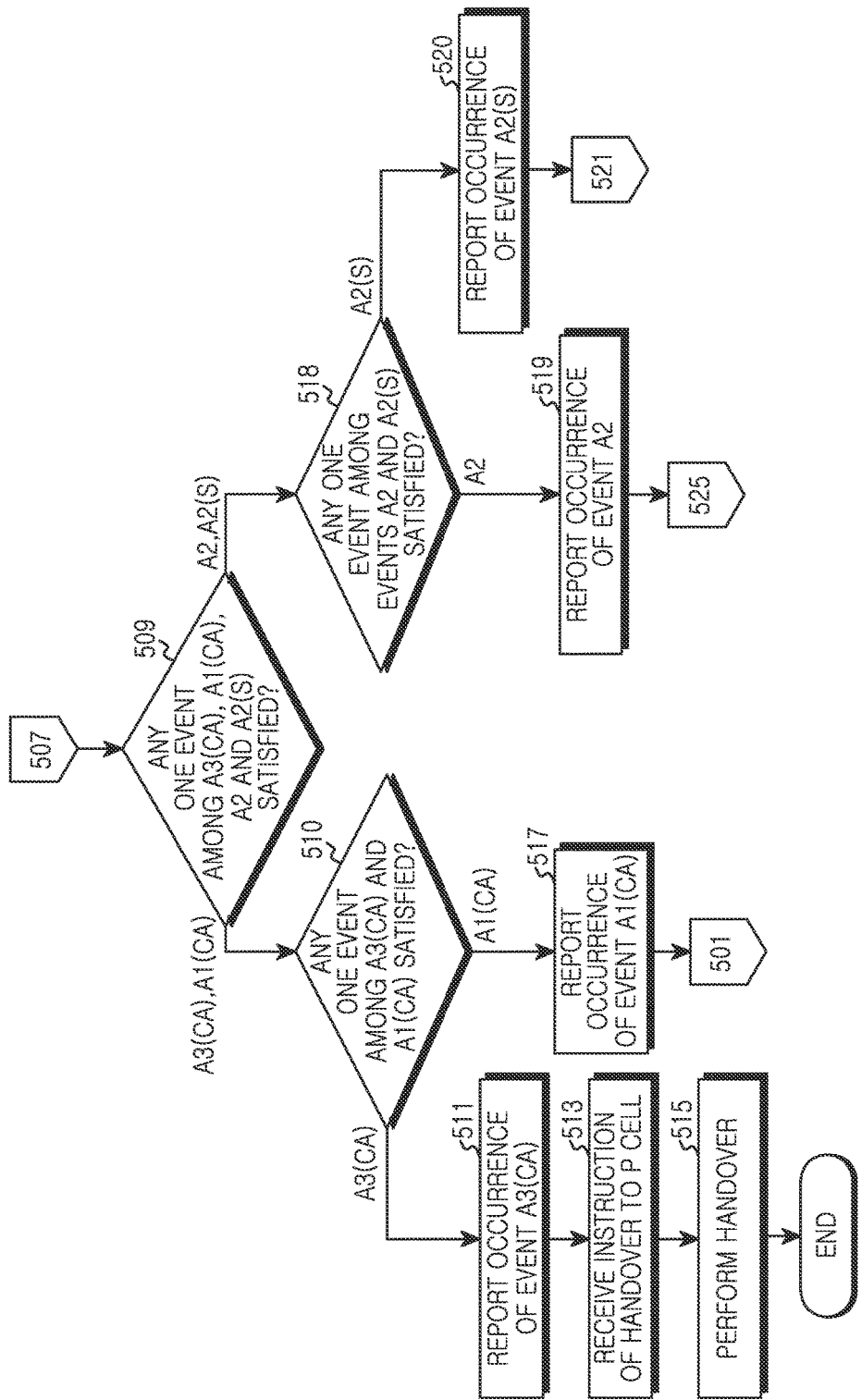

FIGS. 5A and 5B are flowcharts illustrating an operation procedure for a handover in an MS 300 according to various embodiments of the present disclosure.

Referring to FIGS. 5A and 5B, in operation 501, the MS 300 checks if a measurement configuration set of a specific measurement report event condition, i.e., measurement report event is received from a BS 200. For example, the MS 300 checks if a measurement condition, i.e., measurement configuration set of a specific measurement report related event is included in an RRC connection reconfiguration message received from the BS 200.

If a condition for events A2(CA) and A2(S) is received from the BS 200, then in operation 503, the MS 300 checks a measurement object frequency of a measurement configuration set of the event A2(CA) and a threshold value and then, compares a received signal strength of the measurement object frequency of the event A2(CA) with the threshold value to check if the event A2(CA) is satisfied, and checks a measurement object frequency of a measurement configuration set of the event A2(S) to check the occurrence or non-occurrence of a situation of release of connection with a cell associated with a corresponding frequency. Here, the measurement object frequency of the event A2(CA) may represent a carrier frequency of a P cell of the MS 300, and the threshold value may be a value greater than a threshold value of an event A2.

If the event A2(CA) is satisfied, then the MS 300 proceeds to operation 505 and reports the occurrence of the event A2(CA) to the BS 200. For example, the MS 300 may report that the event A2(CA) has occurred to the BS 200 through a measurement report message. After that, in operation 507, the MS 300 may receive a measurement condition, i.e., measurement configuration set of each of an event A1(CA), an event A3(CA), and an event A2.

For example, the MS 300 may receive from the BS 200 an RRC connection reconfiguration message including a measurement configuration set of each of the event A1 (CA), the event A3(CA), and the event A2. Here, the RRC connection reconfiguration message may include information requesting release of setting-up of the measurement configuration set of the event A2(CA) received through a previous RRC connection reconfiguration message.

After that, in operation 509, operation 510, and operation 518, the MS 300 checks if any one event among the event A1(CA), the event A3(CA), the event A2(S), and the event A2 is satisfied based on the measurement configuration sets of the event A1 (CA), the event A3(CA), the event A2(S), and the event A2. That is, the MS 300 may check a measurement object frequency of the measurement configuration set of each event and a threshold value and/or offset and then, compare a received signal strength of the measurement object frequency with the threshold value or determine whether there is as much difference as the offset between the received signal strength of the measurement object frequency and a received signal strength of an adjacent cell, and check if any one event among the event A1(CA), the event A3(CA), the event A2(S), and the event A2 is satisfied.

For example, if the measurement object frequency of the measurement configuration set of the event A1(CA) is the carrier frequency of the P cell, and a received signal strength from the P cell is greater than a threshold value TH_A1 (CA), then the MS 300 may determine that the event A1(CA) is satisfied. For another example, if the measurement object frequency of the measurement configuration set of the event A3(CA) is a carrier frequency of an S cell, and a received signal strength of an adjacent cell is greater than a received signal strength of the S cell by an offset OFFSET_A3(CA) or more, then the MS 300 may determine that the event A3(CA) is satisfied.

For further example, if the measurement object frequency of the measurement configuration set of the event A2 is the carrier frequency of the P cell, and the received signal strength from the P cell is less than a threshold value TH_A2, then the MS 300 may determine that the event A2 is satisfied. For convenience, the drawings distinguish and illustrate operation 509, operation 510, and operation 518 in which the MS 300 checks if any event among the event A1 (CA), the event A3(CA), the event A2(S), and the event A2 is satisfied, but it is obvious to those skilled in the art that operation 509, Operation 510, and operation 518 may be constructed as one operation.

If it is checked that the event A3(CA) is satisfied in operation 510, then the MS 300 proceeds to operation 511 and reports the occurrence of the event A3(CA) to the BS 200. For example, the MS 300 may transmit to the BS 200 a measurement report message that includes information representing the occurrence of the event A3(CA) and identification information of an adjacent cell whose received signal strength is greater than the received signal strength of the P cell by an offset value or more. Further, after the MS 300 reports the occurrence of the event A3(CA) to the BS 200, the MS 300 may receive an RRC connection reconfiguration message of requesting release of setting-up for the events A3(CA), A1(CA), A2(S), and A2 from the BS 200.

After that, in operation 513, the MS 300 receives an instruction of a handover using a corresponding adjacent cell as the P cell from the BS 200 and, in operation 515, the MS 300 performs handover to the adjacent cell. The MS 300 may receive a handover instruction message of instructing to perform handover using the corresponding adjacent cell as the target P cell. After performing handover to the target cell, the MS 300 terminates the procedure according to an embodiment of the present disclosure.

Meanwhile, if it is checked that the event A1(CA) is satisfied in operation 510, then the MS 300 proceeds to operation 517 and reports the occurrence of the event A1(CA) to the BS 200, and returns to operation 501 and again performs subsequent operations. Here, after reporting the occurrence of the event A1(CA) to the BS 200, the MS 300 may receive an RRC connection reconfiguration message of requesting release of setting-up for the events A3(CA), A1(CA) and A2 from the BS 200.

On the other hand, if it is checked that the event A2 is satisfied in operation 518, then the MS 300 proceeds to operation 519 and reports the occurrence of the event A2 to the BS 200, and returns to operation 525 and again performs subsequent operations. Here, after reporting the occurrence of the event A2 to the BS 200, the MS 300 may receive an RRC connection reconfiguration message of requesting release of setting-up for the events A3(CA), A1(CA), A2(S), and A2 from the BS 200.

Meanwhile, if it is checked that the event A2(S) is satisfied in operation 518, then the MS 300 proceeds to operation 520 and reports the occurrence of the event A2(S) to the BS 200, and returns to operation 521 and again performs subsequent operations. Here, after reporting the occurrence of the event A2(S) to the BS 200, the MS 300 may receive an RRC connection reconfiguration message of requesting release of setting-up for the events A3(CA), A1(CA) and A2(S) from the BS 200.

On the other hand, if the checking result of operation 503 is that the event A2(S) is satisfied, then the MS 300 proceeds to operation 520 and reports the occurrence of the event A2(S) to the BS 200. For example, if a connection of the MS 300 with an S cell is released, then the MS 300 may report the occurrence of the event A2(S) to the BS 200 through a measurement report message. After that, the MS 300 may receive an RRC connection reconfiguration message including a measurement condition set of each of the event A2 and the event A4(S) from the BS 200 and proceed to operation 521.

On the other hand, if the checking result of operation 501 is that the condition for the events A2 and A4(S) is received from the BS 200, then in operation 521, the MS 300 checks a measurement object frequency of a measurement configuration set of the event A2 and a threshold value and then, compares a received signal strength of the measurement object frequency of the event A2 with the threshold value to check if the event A2 is satisfied, and checks a measurement object frequency of a measurement configuration set of the event A4(S) to check the occurrence or non-occurrence of a situation of connection with a cell associated with a corresponding frequency. Here, the measurement object frequency of the event A2 may represent a carrier frequency of a P cell of the MS 300, and the threshold value may be a value less than a threshold value of an event A2(CA).

If the event A2 is satisfied, then the MS 300 proceeds to operation 523 and reports the occurrence of the event A2 to the BS 200. For example, the MS 300 may report that the event A2 has occurred to the BS 200 through a measurement report message.

After that, in operation 525, the MS 300 may receive a measurement configuration set of each of an event A1 and an event A3. For example, the MS 300 may receive from the BS 200 an RRC connection reconfiguration message including a measurement configuration set of each of the event A1 and the event A3. Here, the RRC connection reconfiguration message may include information requesting release of setting-up of the measurement configuration sets of the event A2 and the event A4(S) received through a previous RRC connection reconfiguration message.

After that, in operation 527, the MS 300 checks if any one event among the event A1 and the event A3 is satisfied based on the measurement configuration sets of the event A1 and the event A3. That is, the MS 300 may check a measurement object frequency of the measurement configuration set of each event and a threshold value and/or offset and then, compare a received signal strength of the measurement object frequency with the threshold value or determine whether there is as much difference as the offset between the received signal strength of the measurement object frequency and a received signal strength of an adjacent cell, and check if any one event among the event A1 and the event A3 is satisfied.

For example, if the measurement object frequency of the measurement configuration set of the event A1 is the carrier frequency of the P cell (or the cell that the MS 300 is accessing), and a received signal strength from the P cell is greater than a threshold value TH_A1, then the MS 300 may determine that the event A1 is satisfied. For another example, if the measurement object frequency of the measurement configuration set of the event A3 is the carrier frequency of the P cell (or the cell that the MS 300 is accessing), and a received signal strength of an adjacent cell is greater than a received signal strength of the P cell by an offset OFFSET_A3 or more, then the MS 300 may determine that the event A3 is satisfied.

If it is checked that the event A3 is satisfied in operation 527, then the MS 300 proceeds to operation 529 and reports the occurrence of the event A3 to the BS 200. Here, after reporting the occurrence of the event A3 to the BS 200, the MS 300 may receive an RRC connection reconfiguration message of requesting release of setting-up for the events A3 and A1 from the BS 200.

Next, in operation 531, the MS 300 receives a handover instruction using a corresponding adjacent cell as a P cell from the BS 200 and, in operation 533, the MS 300 performs a handover to the adjacent cell. For example, the MS 300 may transmit to the BS 200 a measurement report message that includes information representing the occurrence of the event A3 and identification information of an adjacent cell whose received signal strength is greater than a received signal strength of the P cell (or the cell that the MS 300 is accessing) by an offset value or more. After that, the MS 300 may receive a handover instruction message of instructing to perform handover using a corresponding adjacent cell as a target P cell. After performing handover to the target cell, the MS 300 terminates the procedure according to the embodiment of the present disclosure.

Meanwhile, if it is checked that the event A1 is satisfied in operation 527, then the MS 300 proceeds to operation 535 and reports the occurrence of the event A1 to the BS 200, and returns to operation 501 and again performs subsequent operations. Here, after reporting the occurrence of the event A1 to the BS 200, the MS 300 may receive an RRC connection reconfiguration message of requesting release of setting-up for the events A3 and A1 from the BS 200.

On the other hand, if the checking result of operation 521 is that the event A4(S) is satisfied, then in operation 537, the MS 300 reports the occurrence of the event A4(S) to the BS 200. Here, after reporting the occurrence of the event A3 to the BS 200, the MS 300 may receive an RRC connection reconfiguration message of requesting release of setting-up for the events A4(S) and A2 from the BS 200. For example, while the MS 300 is a CA MS but is using only a signal of a P cell because receiving only the signal of the P cell and not receiving a signal of an S cell in a position of the MS 300, if the MS 300 is made possible to receive the signal of the S cell due to the movement of the MS 300, the MS 300 may use the P cell and the S cell concurrently. As above, if the MS 300 gets to additionally use the S cell in course of using only the P cell, the MS 300 reports that the event A4(S) has occurred to the BS 200, and returns to operation 501.

Figure 6A:
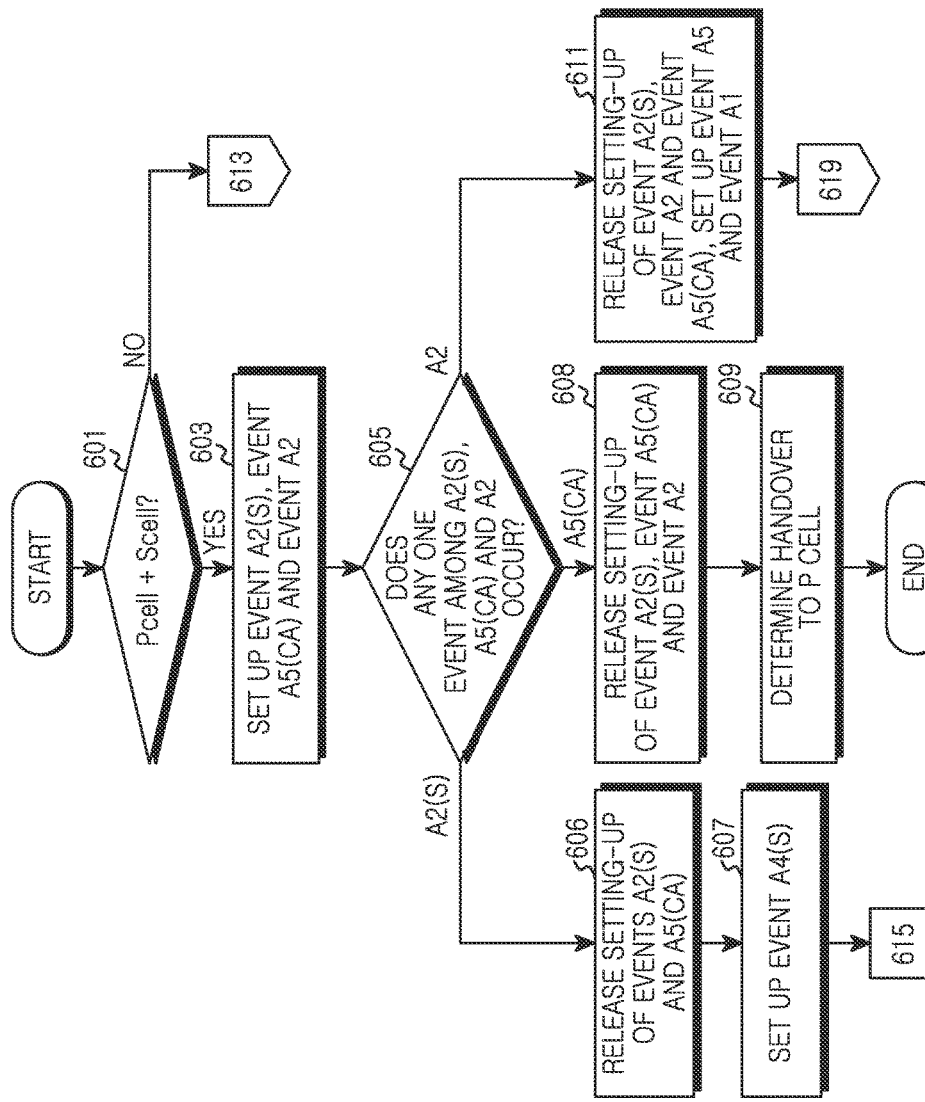
FIGS. 6A and 6B are flowcharts illustrating a procedure of controlling a handover of an MS in a BS according to various embodiments of the present disclosure.
Figure 6B:
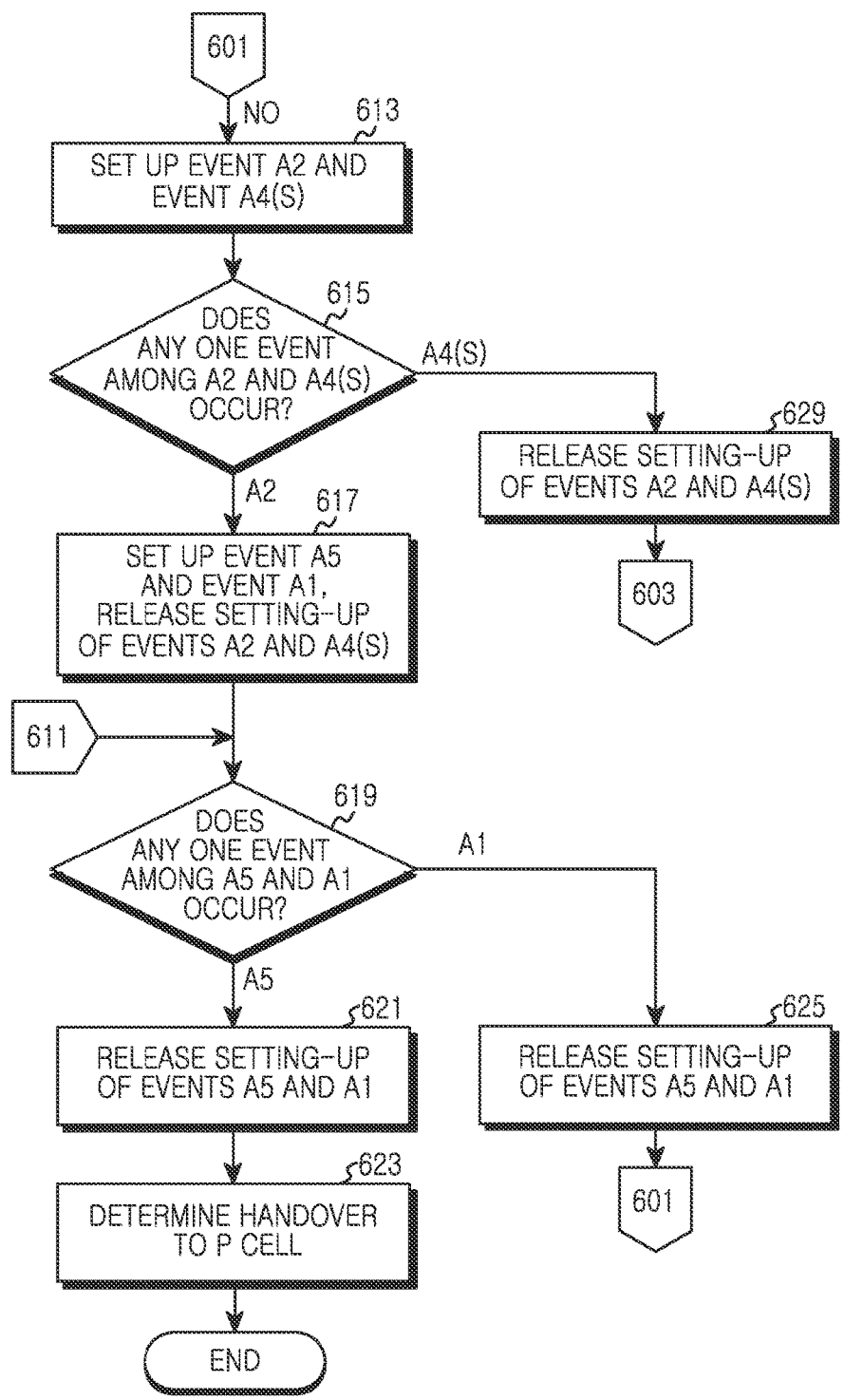

FIGS. 6A and 6B are flowcharts illustrating a procedure of controlling a handover of an MS 300 in a BS 200 according to various embodiments of the present disclosure.

Referring to FIG. 6A and FIG. 6B, in operation 601, a BS 200 checks if an MS 300 concurrently uses a P cell and an S cell. For example, the BS 200 may receive information of a cell that is currently being used from the MS 300, and check if the MS 300 is a CA MS concurrently using the P cell and the S cell or if the MS 300 is a non-CA MS using only the P cell as a serving cell.

If the MS 300 concurrently uses the P cell and the S cell, then in operation 603, the BS 200 sets up an event A2, an event A2(S), and an event A5(CA). For example, the BS 200 may transmit to the MS 300 an RRC connection reconfiguration message including a measurement configuration set of each of the event A5(CA) and the event A2. Here, the measurement configuration set of the event A5(CA) may have a carrier frequency of the S cell as a measurement object, and the measurement configuration set of the event A2 may have a carrier frequency of the P cell as a measurement object, and the measurement configuration set of the event A2(S) may have a carrier frequency of the S cell as a measurement object.

After that, the BS 200 proceeds to operation 605 and checks if any event among the event A5(CA), the event A2(S) and the event A2 occurs. Through a measurement report message received from the MS 300, the BS 200 may check if any event among the event A5(CA), the event A2(S), and the event A2 occurs.

If it is checked that the event A2(S) occurs in operation 605, then in operation 606, the BS 200 may release setting-up for the event A2(S) and the event A5(CA) and, in operation 607, the BS 200 may set up an event A4(S) and then proceed to Operation 615. At this time, the BS 200 may also maintain setting-up for the event A2, or reset the event A2 after releasing setting-up for the event A2.

If it is checked that the event A5(CA) occurs in operation 605, then in operation 608, the BS 200 releases setting-up for the event A2(S), the event A5(CA), the event A2.

Next, in operation 609, the BS 200 determines a handover using an adjacent cell reported from the MS 300 as a target P cell. For example, when the occurrence of the event A5(CA) is reported from the MS 300, because a received signal strength of an S cell is received less than a 1st threshold value and a received signal strength from an adjacent cell on an S cell frequency is received greater than a 2nd threshold value in a state in which the MS 300 is positioned at a middle electric field or less of the P cell, the BS 200 predicts that, if the MS 300 performs a handover to the adjacent cell, it may improve a data transmission/reception efficiency of the MS 300 to a constant level or more, and determines to make the MS 300 perform handover to the adjacent cell. At this time, the MS 300 may perform handover using the adjacent cell as a P cell in accordance with control of the BS 200 and, if an S cell mapped to the P cell exists and is available, the MS 300 may use the P cell and the S cell together.

Meanwhile, if it is checked that the event A2 occurs in operation 605, then in operation 611, the BS 200 releases setting-up for the event A2(S), the event A2, and the event A5(CA) while setting up an event A5 and an event A1, and then proceeds to operation 619.

If the checking result of operation 601 is that the MS 300 uses only the P cell, then in operation 613, the BS 200 sets up the event A2 and the event A4(S), and proceeds to operation 615 and checks if any one event among the event A2 and the event A4(S) occurs in the MS 300. For example, the BS 200 transmits to the MS 300 an RRC connection reconfiguration message including a measurement configuration set of the event A2 and a measurement configuration set of the event A4(S) for detecting a situation of addition of an S cell as described in Table 1, and allows the MS 300 to set up a measurement configuration set representing a condition for detecting the occurrence of the event A2 and the event A4(S), and checks if a measurement report message of reporting the occurrence of any one event among the event A2 and the event A4(S) is received from the MS 300.

If it is checked that the event A2 occurs in the MS 300 in operation 615, then in operation 617, the BS 200 sets up an event A5 and an event A1, and releases setting-up for the event A2 and the event A4(S). For example, the BS 200 may transmit to the MS 300 an RRC connection reconfiguration message including a measurement configuration set of each of the event A5 and the event A1 and requesting release of setting-up of the measurement configuration set of the event A2 and the measurement configuration set of the event A4(S). At this time, the measurement configuration sets of the events A1 and A5 have a carrier frequency of the P cell (or the cell that the MS 300 is accessing) as a measurement object.

After that, the BS 200 proceeds to operation 619 and checks if any event among the event A5 and the event A1 occurs. Through a measurement report message received from the MS 300, the BS 200 may check if any event among the event A5 and the event A1 occurs.

If it is checked that the event A5 occurs in operation 619, then in operation 621, the BS 200 releases setting-up for the event A5 and the event A1. Next, in operation 623, the BS 200 determines a handover using an adjacent cell reported from the MS 300 as a target P cell.

Meanwhile, if it is checked that the event A1 occurs in operation 619, then in operation 625, the BS 200 releases setting-up for the event A5 and the event A1 and returns to operation 601.

On the other hand, if the checking result of operation 615 is that the event A4(S) occurs in the MS 300, then in operation 629, the BS 200 releases setting-up for the event A2 and the event A4(S), and goes to operation 603 and performs subsequent operations. For example, while the MS 300 is a CA MS, but is using only a signal of a P cell because receiving only the signal of the P cell and not receiving a signal of an S cell in a position of the MS 300, if the MS 300 is made possible to receive the signal of the S cell due to the movement of the MS 300, then the BS 200 may allow the MS 300 to use the P cell and the S cell concurrently. After that, the BS 200 may determine that the MS 300 uses the P cell and the S cell concurrently, and proceed to operation 603 and perform subsequent operations.

Figure 7:
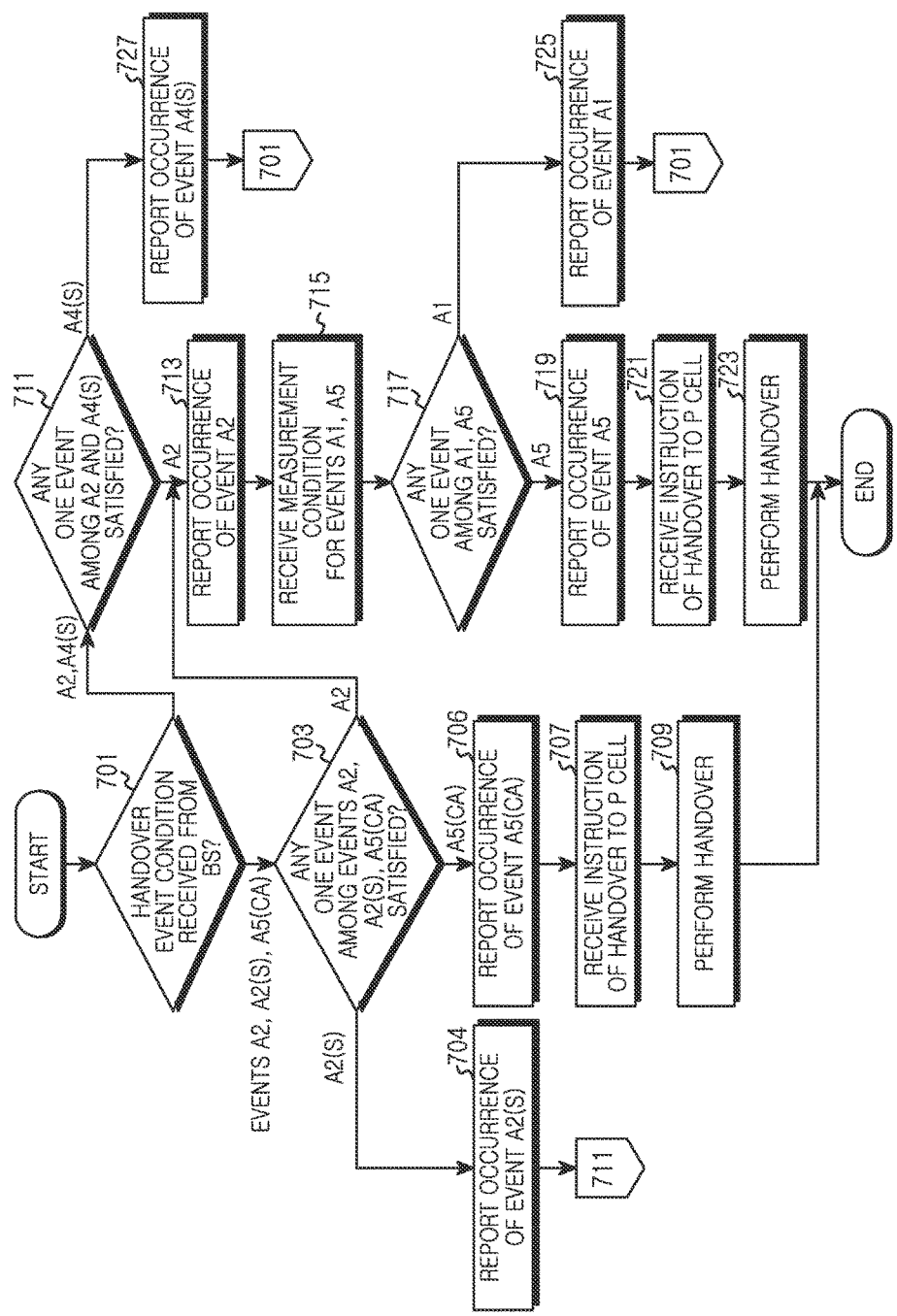
FIG. 7 is a flowchart illustrating an operation procedure for a handover in an MS according to an embodiment of the present disclosure.

FIG. 7 is a flowchart illustrating an operation procedure for a handover in an MS 300 according to an embodiment of the present disclosure.

Referring to FIG. 7, in operation 701, the MS 300 checks if a measurement configuration set of a specific handover related event condition, i.e., measurement report related event is received from a BS 200. For example, the MS 300 checks if a measurement configuration set of a specific measurement report related event is included in an RRC connection reconfiguration message received from the BS 200.

If a condition for an event A2, an event A2(S), and an event A5(CA) is received from the BS 200, then in operation 703, the MS 300 checks if any one event among the event A2, the event A2(S), and the event A5(CA) is satisfied. For example, the MS 300 checks a measurement object frequency of a measurement configuration set of the event A5(CA) and a threshold value and then, checks if a received signal strength of the measurement object frequency is less than a threshold value TH1_A5(CA) and a received signal strength of an adjacent cell is greater than a threshold value TH2_A5(CA) and checks if the event A5(CA) is satisfied.

Here, the measurement object frequency of the event A5(CA) may represent a carrier frequency for an S cell of the MS 300, and each of the threshold values TH1_A5(CA) and TH2_A5(CA) of the event A5(CA) may be a value greater than each of threshold values TH1_A5 and TH2_A5 of an event A5. For another example, the MS 300 checks a measurement object frequency of a measurement configuration set of the event A2 and a threshold value and then, checks if a received signal strength of the measurement object frequency is less than a threshold value TH_A2 and checks if the event A2 is satisfied. Also, the MS 300 checks a measurement object frequency of a measurement configuration set of the event A2(S) and then, checks if a connection with a cell associated with a corresponding frequency is released.

If it is checked that the event A2 is satisfied in operation 703, then the MS 300 proceeds to operation 713 and performs subsequent operations.

On the other hand, if it is checked that the event A2(S) is satisfied in operation 703, then in operation 704, the MS 300 reports the occurrence of the event A2(S) to the BS 200. For example, if a connection of the MS 300 with an S cell is released, the MS 300 may report the occurrence of the event A2(S) to the BS 200 through a measurement report message. After that, the MS 300 may receive an RRC connection reconfiguration message of requesting release of setting-up of the event A5(CA) and the event A2(S) and including a measurement condition set of each of the event A2 and the event A4(S) from the BS 200, and proceed to operation 711.

Meanwhile, if it is checked that the event A5(CA) is satisfied in operation 703, then the MS 300 proceeds to operation 706 and reports the occurrence of the event A5(CA) to the BS 200. For example, the MS 300 may transmit to the BS 200 a measurement report message that includes information representing the occurrence of the event A5(CA) and identification information of an adjacent cell whose received signal strength is greater than a threshold value TH2_A5(CA). Further, after the MS 300 reports the occurrence of the event A5(CA) to the BS 200, the MS 300 may receive an RRC connection reconfiguration message of requesting release of setting-up for the events A5(CA), A2(S), and A2 from the BS 200.

After that, in operation 707, the MS 300 receives an instruction of a handover using a corresponding adjacent cell as the P cell from the BS 200 and, in operation 709, the MS 300 performs handover to the adjacent cell. The MS 300 may receive a handover instruction message of instructing to perform handover using the corresponding adjacent cell as the target P cell. After performing handover to the target cell, the MS 300 terminates the procedure according to the embodiment of the present disclosure.

On the other hand, if the checking result of operation 701 is that the condition for the events A2 and A4(S) is received from the BS 200, then in operation 711, the MS 300 checks a measurement object frequency of a measurement configuration set of the event A2 and a threshold value and then, checks if a received signal strength of the measurement object frequency of the event A2 is less than a threshold value TH_A2 to check if the event A2 is satisfied, and checks a measurement object frequency of a measurement configuration set of the event A4(S) to check the occurrence or non-occurrence of a situation of connection with a cell associated with a corresponding frequency. Here, the measurement object frequency of the event A2 may represent a carrier frequency of a P cell (or a cell that the MS 300 is accessing) of the MS 300, and the threshold value TH_A2 of the event A2 may be a value less than a threshold value TH_A2(CA) of an event A2(CA).

If the event A2 is satisfied, then the MS 300 proceeds to operation 713 and reports the occurrence of the event A2 to the BS 200. For example, the MS 300 may report that the event A2 has occurred to the BS 200 through a measurement report message.

After that, in operation 715, the MS 300 may receive a measurement configuration set of each of an event A1 and an event A5. For example, the MS 300 may receive from the BS 200 an RRC connection reconfiguration message including a measurement configuration set of each of the event A1 and the event A5. Here, the RRC connection reconfiguration message may include information requesting release of setting-up of the measurement configuration sets of the event A2 and the event A4(S) received through a previous RRC connection reconfiguration message.

After that, in operation 717, the MS 300 checks if any one event among the event A1 and the event A5 is satisfied based on the measurement configuration sets of the event A1 and the event A5. That is, the MS 300 may check a measurement object frequency of the measurement configuration set of each event and a threshold value and then, compare a received signal strength of the measurement object frequency with the threshold value and check if any one event among the event A1 and the event A5 is satisfied.

For example, if the measurement object frequency of the measurement configuration set of the event A1 is the carrier frequency of the P cell (or the cell that the MS 300 is accessing), and a received signal strength from the P cell is greater than a threshold value TH_A1, then the MS 300 may determine that the event A1 is satisfied. Here, the TH_A1 may be a value less than the TH_A1 (CA). For another example, if the measurement object frequency of the measurement configuration set of the event A5 is the carrier frequency of the P cell (or the cell that the MS 300 is accessing), and a received signal strength from the P cell is less than a threshold value TH1_A5 and a received signal strength from an adjacent cell is greater than a threshold value TH2_A5, then the MS 300 may determine that the event A5 is satisfied.

If it is checked that the event A5 is satisfied in operation 717, then the MS 300 proceeds to operation 719 and reports the occurrence of the event A5 to the BS 200. Here, after reporting the occurrence of the event A5 to the BS 200, the MS 300 may receive an RRC connection reconfiguration message of requesting release of setting-up for the events A5 and A1 from the BS 200.

Next, in operation 721, the MS 300 receives a handover instruction using a corresponding adjacent cell as a P cell from the BS 200 and, in operation 723, the MS 300 performs handover to the adjacent cell. For example, the MS 300 may transmit to the BS 200 a measurement report message that includes information representing the occurrence of the event A5 and identification information of the adjacent cell whose received signal strength is greater than the threshold value TH2_A5. After that, the MS 300 may receive a handover instruction message of instructing to perform handover using a corresponding adjacent cell as a target P cell. After performing handover to the target cell, the MS 300 terminates the procedure according to the embodiment of the present disclosure.

Meanwhile, if it is checked that the event A1 is satisfied in operation 717, then the MS 300 proceeds to operation 725 and reports the occurrence of the event A1 to the BS 200, and returns to operation 701 and again performs subsequent operations. Here, after reporting the occurrence of the event A1 to the BS 200, the MS 300 may receive an RRC connection reconfiguration message of requesting release of setting-up for the events A5 and A1 from the BS 200.

On the other hand, if the checking result of operation 711 is that the event A4(S) is satisfied, then in operation 727, the MS 300 reports the occurrence of the event A4(S) in the MS 300 to the BS 200. Here, after reporting the occurrence of the event A4(S) to the BS 200, the MS 300 may receive an RRC connection reconfiguration message of requesting release of setting-up for the events A4(S) and A2 from the BS 200. For example, while the MS 300 is a CA MS but is using only a signal of a P cell because receiving only the signal of the P cell and not receiving a signal of an S cell in a position of the MS 300, if the MS 300 is made possible to receive the signal of the S cell due to the movement of the MS 300, the MS 300 may use the P cell and the S cell concurrently. As above, if the MS 300 gets to additionally use the S cell in course of using only the P cell, the MS 300 reports that the event A4(S) has occurred to the BS 200, and returns to operation 701.

The present disclosure has an effect of, under the circumstances of a middle electric field or less of a P cell that a CA MS using all of a P cell and an S cell is accessing, although not satisfying a condition of a handover event defined in the existing handover standard, performing handover to another cell within an S cell frequency zone having a better channel condition than the P cell, so as to be able to always keep the P cell in a good channel state and guarantee a data transmission/reception efficiency higher than that of a non-CA MS.

According to an embodiment of the present disclosure, a method of a BS of a CA system comprises: determining whether an MS concurrently uses a first cell associated with a first carrier frequency and a second cell associated with a second carrier frequency; and controlling a handover of the MS using a measurement configuration set corresponding to a result of the determination among a plurality of measurement configuration sets that are set for each of handover related events.

In the embodiment of the present disclosure, the plurality of measurement configuration sets that are set for each of handover related events comprise a first measurement configuration set and a second measurement configuration set for a handover of a CA MS, for each of handover related events, wherein the handover related events comprise at least one of an event A1, an event A2, an event A3, and an event A5, wherein each measurement configuration set comprises at least one of measurement frequency information, corresponding handover related event identification information, a threshold value, and an offset value, and wherein the threshold value or the offset value of a second measurement configuration set of each handover related event is set as a value greater than or equal to the threshold value or the offset value of a first measurement configuration set of each handover related event.

In the embodiment of the present disclosure, the controlling the handover of the MS comprises: if the MS concurrently uses the first cell and the second cell, selecting a second measurement configuration set of the event A2 for reporting an occurrence of the event A2 when a received signal strength from the first cell is less than a first threshold value; transmitting the second measurement configuration set to the MS; receiving a report of the occurrence of the event A2 from the MS; selecting a second measurement configuration set of the event A3 for reporting an occurrence of the event A3 when an adjacent cell having a received signal strength that is greater than a received signal strength from the second cell by the offset value or more is detected; transmitting the second measurement configuration set to the MS; receiving a report of the occurrence of the event A3 from the MS; and controlling to perform the handover from the first cell to the adjacent cell detected by the MS.

In the embodiment of the present disclosure, wherein the controlling the handover of the MS comprises: if the MS concurrently uses the first cell and the second cell, selecting a second measurement configuration set of the event A2 for reporting an occurrence of the event A2 when a received signal strength from the first cell is less than a first threshold value; transmitting the second measurement configuration set to the MS; receiving a report of the occurrence of the event A2 from the MS; selecting a second measurement configuration set of the event A5 for reporting an occurrence of the event A5 when a received signal strength from the second cell is less than a second threshold value and a received signal strength from an adjacent cell is greater than a third threshold value; transmitting the second measurement configuration set to the MS; receiving a report of the occurrence of the event A5 from the MS; and controlling to perform the handover from the first cell to the adjacent cell.

In the embodiment of the present disclosure, the controlling the handover of the MS comprises: if the MS concurrently uses the first cell and the second cell, transmitting to the MS a measurement configuration set for detecting a situation of a release of a connection with the second cell; and if the MS uses only the first cell, transmitting to the MS a measurement configuration set for detecting a situation of an addition of the connection with the second cell.

According to an embodiment of the present disclosure, a method of an MS in a CA system comprises: receiving a measurement configuration set dependent on whether the MS concurrently uses a first cell associated with a first carrier frequency and a second cell associated with a second carrier frequency; and detecting and reporting an occurrence or a non-occurrence of a corresponding handover related event based on the measurement configuration set.

In the embodiment of the present disclosure, regarding each handover related event, the measurement configuration set is any one of a first measurement configuration set and a second measurement configuration set that is set up for a handover of a CA MS concurrently using the first cell and the second cell, wherein the each of handover related events comprises at least one of an event A1, an event A2, an event A3, and an event A5, wherein each measurement configuration set comprises at least one of measurement frequency information, corresponding handover related event identification information, a threshold value, and an offset value, and wherein the threshold value or the offset value of a second measurement configuration set of each handover related event is a value greater than or equal to a threshold value or offset of a first measurement configuration set of each handover related event.

In the embodiment of the present disclosure, the detecting and reporting of the occurrence or the non-occurrence of the corresponding handover related event based on the measurement configuration set comprises: if the MS concurrently uses the first cell and the second cell, receiving a second measurement configuration set of the event A2 for requesting to report an occurrence of the event A2 when a received signal strength from the first cell is less than a first threshold value; reporting the occurrence of the event A2; receiving a second measurement configuration set of the event A3 for requesting to report the occurrence of the event A3 when an adjacent cell having a received signal strength that is greater than a received signal strength from the second cell by an offset value or more is detected; reporting the occurrence of the event A3; receiving a message of instruction of a handover from the first cell to the detected adjacent cell; performing the handover using the adjacent cell as a first cell; and if a second cell mapped to the first cell exists, concurrently using the first cell and the second cell.

In the embodiment of the present disclosure, the detecting and reporting of the occurrence or the non-occurrence of the corresponding handover related event based on the measurement configuration set comprises: if the MS concurrently uses the first cell and the second cell, receiving a second measurement configuration set of the event A2 for requesting to report the occurrence of the event A2 when a received signal strength from the first cell is less than a first threshold value; reporting an occurrence of the event A2; receiving a second measurement configuration set of the event A5 for requesting to report an occurrence of the event A5 when a received signal strength from the second cell is less than a second threshold value and a received signal strength from an adjacent cell is greater than a third threshold value; reporting the occurrence of the event A5; receiving a message of instruction of handover from the first cell to the adjacent cell; performing the handover using the adjacent cell as a first cell; and if a second cell mapped to the first cell exists, concurrently using the first cell and the second cell.

In the embodiment of the present disclosure, the measurement configuration set comprises a measurement configuration set for detecting a situation of a release of a connection with the second cell when the MS concurrently uses the first cell and the second cell, and comprises a measurement configuration cell for detecting a situation of an addition of the connection with the second cell when the MS uses only the first cell.

According to an embodiment of the present disclosure, a BS of a CA system comprises: a transceiver for transmitting/receiving a signal with the MS; a storage unit for storing a plurality of measurement configuration sets that are set for each of handover related events; and a control unit for determining whether an MS concurrently uses a first cell associated with a first carrier frequency and a second cell associated with a second carrier frequency, and controlling handover of the MS using a measurement configuration set corresponding to the determination result among the plurality of measurement configuration sets that are set for each of handover related events.

In the embodiment of the present disclosure, the plurality of measurement configuration sets that are set for each of handover related events comprise a first measurement configuration set and a second measurement configuration set for handover of a CA MS, for each of handover related events, wherein the handover related events comprise at least one of an event A1, an event A2, an event A3, and an event A5, wherein each measurement configuration set comprises at least one of measurement frequency information, corresponding handover related event identification information, a threshold value, and an offset value, and wherein the threshold value or the offset value of a second measurement configuration set of each handover related event is set as a value greater than or equal to the threshold value or the offset value of a first measurement configuration set of each handover related event.

In the embodiment of the present disclosure, if the MS concurrently uses the first cell and the second cell, the control unit selects a second measurement configuration set of the event A2 for reporting an occurrence of the event A2 when a received signal strength from the first cell is less than a first threshold value, and transmits the second measurement configuration set to the MS, when receiving a report of the occurrence of the event A2 from the MS, selects a second measurement configuration set of the event A3 for reporting an occurrence of the event A3 when an adjacent cell whose received signal strength is greater than a received signal strength from the second cell by an offset value or more is detected, and transmits the second measurement configuration set to the MS, and when receiving a report of the occurrence of the event A3 from the MS, controls to perform handover from the first cell to the adjacent cell detected by the MS.

In the embodiment of the present disclosure, if the MS concurrently uses the first cell and the second cell, the control unit selects a second measurement configuration set of the event A2 for reporting the occurrence of the event A2 when a received signal strength from the first cell is less than a first threshold value, and transmits the second measurement configuration set to the MS, when receiving a report of the occurrence of the event A2 from the MS, selects a second measurement configuration set of the event A5 for reporting the occurrence of the event A5 when a received signal strength from the second cell is less than a second threshold value and a received signal strength from an adjacent cell is greater than a third threshold value, and transmits the second measurement configuration set to the MS, and when receiving a report of the occurrence of the event A5 from the MS, controls to perform handover from the first cell to the adjacent cell.

In the embodiment of the present disclosure, if the MS concurrently uses the first cell and the second cell, the control unit transmits to the MS a measurement configuration set for detecting a situation of release of connection with the second cell and, if the MS uses only the first cell, transmits to the MS a measurement configuration set for detecting a situation of addition of connection with the second cell.

According to an embodiment of the present disclosure, an MS of a CA system comprises: a transceiver for transmitting/receiving a signal; and a control unit for receiving a measurement configuration set dependent on whether the MS concurrently uses a first cell associated with a first carrier frequency and a second cell associated with a second carrier frequency, and detecting and reporting an occurrence or a non-occurrence of a corresponding handover related event based on the measurement configuration set.

In the embodiment of the present disclosure, regarding each handover related event, the measurement configuration set is any one of a first measurement configuration set and a second measurement configuration set that is set up for handover of a CA MS concurrently using the first cell and the second cell, wherein the each handover related event comprises at least one of an event A1, an event A2, an event A3, and an event A5, wherein each measurement configuration set comprises at least one of measurement frequency information, corresponding handover related event identification information, a threshold value, and an offset value, and wherein the threshold value or the offset value of a second measurement configuration set of each handover related event is a value greater than or equal to a threshold value or offset of a first measurement configuration set of each handover related event.

In the embodiment of the present disclosure, the control unit controls a function for, if the MS concurrently uses the first cell and the second cell, receiving a second measurement configuration set of the event A2 for requesting to report an occurrence of the event A2 when a received signal strength from the first cell is less than a first threshold value, and reporting the occurrence of the event A2, and controls to perform a function for receiving a second measurement configuration set of the event A3 for requesting to report an occurrence of the event A3 when an adjacent cell whose received signal strength is greater than a received signal strength from the second cell by an offset value or more is detected, and reporting the occurrence of the event A3, receiving a message of instruction of handover from the first cell to the detected adjacent cell, performing handover using the adjacent cell as a first cell, and, if a second cell mapped to the first cell exists, concurrently using the first cell and the second cell.

In the embodiment of the present disclosure, the control unit controls to perform a function for, if the MS concurrently uses the first cell and the second cell, receiving a second measurement configuration set of the event A2 for requesting to report an occurrence of the event A2 when a received signal strength from the first cell is less than a first threshold value, and reporting the occurrence of the event A2, receiving a second measurement configuration set of the event A5 for requesting to report an occurrence of the event A5 when a received signal strength from the second cell is less than a second threshold value and a received signal strength from an adjacent cell is greater than a third threshold value, and reporting the occurrence of the event A5, receiving a message of instruction of handover from the first cell to the adjacent cell, performing handover using the adjacent cell as a first cell and, if a second cell mapped to the first cell exists, concurrently using the first cell and the second cell.

In the embodiment of the present disclosure, the measurement configuration set comprises a measurement configuration set for detecting a situation of release of connection with the second cell when the MS concurrently uses the first cell and the second cell, and comprises a measurement configuration cell for detecting a situation of addition of connection with the second cell when the MS uses only the first cell.

Various embodiments and all function operations of the present disclosure described in the present specification may be implemented by computer software including structures disclosed in the present specification and equivalent structures thereof, firmware, hardware or a combination of two or more of them. Also, the various embodiments of the present disclosure described in the present specification may be implemented by one or more computer program products, i.e., data processing devices, or may be implemented by one or more modules of computer program instructions encoded on a computer-readable medium for controlling operations of these devices.

The computer-readable medium may be a machine-readable storage medium, a machine-readable storage substrate, a memory device, a construction of substance affecting a machine-readable radio wave stream, or a combination of two or more of them. The term of data processing device may include, for example, all nodes, devices and machines for processing data including a programmable processor or computer, or a multi-processor or computer. The node may include a code added to hardware and generating an execution environment for a corresponding computer program, for example, a code constructing a processor firmware, a protocol stack, a database management system, an operating system, or a combination of two or more of them.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a base station (BS) supporting a carrier aggregation (CA) in a wireless communication system, the method comprising:
   transmitting, to a terminal receiving data from a primary cell and a secondary cell based on the CA, first measurement configuration for a first handover event, the first measurement configuration including a first threshold value;
   receiving, from the terminal, a report of the first handover event indicating that a signal strength of the primary cell is lower than the first threshold value;
   transmitting, to the terminal, second measurement configuration for the first handover event and a measurement configuration for a second handover event in response to the report of the first handover event, the second measurement configuration including a second threshold value;
   receiving, from the terminal, a report of the second handover event based on the measurement configuration for the second handover event; and
   transmitting, to the terminal, a handover command for a handover of the terminal from the primary cell to a neighbor cell in response to the report of the second handover event,
   wherein the signal strength of the primary cell is higher than the second threshold value.

2. The method of claim 1, further comprising:
   determining at least one of a first set of measurement configurations comprising the second measurement configuration, and a second set of measurement configurations comprising the first measurement configuration and the measurement configuration for the second handover event,
   wherein the first set and the second set are related to handover events comprising at least one of an event A1, an event A2, an event A3, or an event A5,
   wherein the event A1 is a handover event which occurs when a signal strength of a serving cell of the terminal is greater than a threshold value included in a measurement configuration for the event A1,
   wherein the event A2 is a handover event which occurs when a signal strength of a serving cell of the terminal is less than a threshold value included in a measurement configuration for the event A2,
   wherein the event A3 is a handover event which occurs when a signal strength of an adjacent cell is greater than a signal strength of a serving cell of the terminal by a threshold offset value or more included in a measurement configuration for the event A3,
   wherein the event A5 is a handover event which occurs when a signal strength of a serving cell of the terminal is less than a threshold value included in a measurement configuration for the event A5 and a signal strength of an adjacent cell is greater than another threshold value included in the measurement configuration for the event A5,
   wherein each measurement configuration comprises at least one of measurement frequency information, handover event identification information, a threshold value, or an offset value, and
   wherein a threshold value or an offset value in a measurement configuration of the second set is set as a value that is greater than or equal to that in a measurement configuration of the first set.

3. The method of claim 2,
   wherein the first handover event is the event A2,
   wherein the second handover event is the event A3, and
   wherein the report of the event A3 is received from the terminal if a signal strength of the neighbor cell is higher than the signal strength of the primary cell by an offset value in the measurement configuration for the second handover event or more.

4. The method of claim 2,
   wherein the first handover event is the event A2,
   wherein the second handover event is the event A5, and
   wherein the report of the event A5 is received from the terminal if a signal strength of the neighbor cell is greater than a threshold value in the measurement configuration for the second handover event and the signal strength of the primary cell is lower than another threshold value in the measurement configuration for the second handover event.

5. The method of claim 1, further comprising:
   transmitting, to the terminal, a measurement configuration for detecting an event of a release of a connection from the secondary cell.

6. A method of a terminal supporting a carrier aggregation (CA) in a wireless communication system, the method comprising:
   receiving data from a primary cell and a secondary cell based on the CA;
   receiving, from a base station (BS), a first measurement configuration for a first handover event, the first measurement configuration including a first threshold value;
   transmitting, to the BS, a report of the first handover event indicating that a signal strength of the primary cell is lower than the first threshold value;
   receiving, from the BS, second measurement configuration for the first handover event and a measurement configuration for a second handover event in response to the report of the first handover event, the second measurement configuration including a second threshold value;
   transmitting, to the BS, a report of the second handover event based on the measurement configuration for the second handover event; and
   receiving, from the BS, a handover command for a handover of the terminal from the primary cell to a neighbor cell in response to the report of the second handover event,
   wherein the signal strength of the primary cell is higher than the second threshold value.

7. The method of claim 6,
   wherein the second measurement configuration is included in a first set of measurement configurations, and the first measurement configuration and the measurement configuration for the second handover event are included in a second set of measurement configurations,
   wherein the first set and the second set are related to handover events comprising at least one of an event A1, an event A2, an event A3, or an event A5,
   wherein the event A1 is a handover event which occurs when a signal strength of a serving cell of the terminal is greater than a threshold value included in a measurement configuration for the event A1, wherein the event A2 is a handover event which occurs when a signal strength of a serving cell of the terminal is less than a threshold value included in a measurement configuration for the event A2, wherein the event A3 is a handover event which occurs when a signal strength of an adjacent cell is greater than a signal strength of a serving cell of the terminal by a threshold offset value or more included in a measurement configuration for the event A3, wherein the event A5 is a handover event which occurs when a signal strength of a serving cell of the terminal is less than a threshold value included in a measurement configuration for the event A5 and a signal strength of an adjacent cell is greater than another threshold value included in the measurement configuration for the event A5, wherein each measurement configuration comprises at least one of measurement frequency information, handover event identification information, a threshold value, or an offset value, and wherein a threshold value or an offset value in a measurement configuration of the second set is set as a value that is greater than or equal to that in a measurement configuration of the first set.

8. The method of claim 7,
wherein the first handover event is the event A2,
wherein the second handover event is the event A3, and
wherein the report of the event A3 is transmitted by the terminal if a signal strength of the neighbor cell is higher than the signal strength of the primary cell by an offset value in the measurement configuration for the second handover event or more.

9. The method of claim 7,
wherein the first handover event is the event A2,
wherein the second handover event is the event A5, and
wherein the report of the event A5 is transmitted by the terminal if a signal strength of the neighbor cell is greater than a threshold value in the measurement configuration for the second handover event and the signal strength of the primary cell is lower than another threshold value in the measurement configuration for the second handover event.

10. The method of claim 6, further comprising:
receiving, from the BS, a measurement configuration for detecting an event of a release of a connection from the secondary cell.

11. A base station (BS) supporting a carrier aggregation (CA) in a wireless communication system, the BS comprising:
at least one transceiver configured to:
transmit, to a terminal receiving data from a primary cell and a secondary cell based on the CA, first measurement configuration for a first handover event, the first measurement configuration including a first threshold value,
receive, from the terminal, a report of the first handover event indicating that a signal strength of the primary cell is lower than the first threshold value,
transmit, to the terminal, second measurement configuration for the first handover event and a measurement configuration for a second handover event in response to the report of the first handover event, the second measurement configuration including a second threshold value,
receive, from the terminal, a report of the second handover event based on the measurement configuration for the second handover event, and
transmit, to the terminal, a handover command for a handover of the terminal from the primary cell to a neighbor cell in response to the report of the second handover event,
wherein the signal strength of the primary cell is higher than the second threshold value.

12. The BS of claim 11, further comprising:
at least one processor configured to determine at least one of a first set of measurement configurations comprising the second measurement configuration, and a second set of measurement configurations comprising the first measurement configuration and the measurement configuration for the second handover event,
wherein the first set and the second set are related to handover events comprising at least one of an event A1, an event A2, an event A3, or an event A5,
wherein the event A1 is a handover event which occurs when a signal strength of a serving cell of the terminal is greater than a threshold value included in a measurement configuration for the event A1,
wherein the event A2 is a handover event which occurs when a signal strength of a serving cell of the terminal is less than a threshold value included in a measurement configuration for the event A2,
wherein the event A3 is a handover event which occurs when a signal strength of an adjacent cell is greater than a signal strength of a serving cell of the terminal by a threshold offset value or more included in a measurement configuration for the event A3,
wherein the event A5 is a handover event which occurs when a signal strength of a serving cell of the terminal is less than a threshold value included in a measurement configuration for the event A5 and a signal strength of an adjacent cell is greater than another threshold value included in the measurement configuration for the event A5,
wherein each measurement configuration comprises at least one of measurement frequency information, handover event identification information, a threshold value, or an offset value, and
wherein a threshold value or an offset value in a measurement configuration of the second set is set as a value that is greater than or equal to that in a measurement configuration of the first set.

13. The BS of claim 12,
wherein the first handover event is the event A2,
wherein the second handover event is the event A3, and
wherein the report of the event A3 is received from the terminal if a signal strength of the neighbor cell is higher than the signal strength of the primary cell by an offset value in the measurement configuration for the second handover event or more.

14. The BS of claim 13,
wherein the first handover event is the event A2,
wherein the second handover event is the event A5, and
wherein the report of the event A5 is received from the terminal if a signal strength of the neighbor cell is greater than a threshold value in the measurement configuration for the second handover event and the signal strength of the primary cell is lower than another threshold value in the measurement configuration for the second handover event.

15. The BS of claim 11, wherein the at least one transceiver is further configured to transmit, to the terminal, a measurement configuration for detecting an event of a release of a connection from the secondary cell.

16. A terminal supporting a carrier aggregation (CA) in a wireless communication system, the terminal comprising:
at least one transceiver configured to:
receive data from a primary cell and a secondary cell based on the CA,
receive, from a base station (BS), a first measurement configuration for a first handover event, the first measurement configuration including a first threshold value,
transmit, to the BS, a report of the first handover event indicating that a signal strength of the primary cell is lower than the first threshold value
receive, from the BS, second measurement configuration for the first handover event and a measurement configuration for a second handover event in response to the report of the first handover event, the second measurement configuration including a second threshold value,
transmit, to the BS, a report of the second handover event based on the measurement configuration for the second handover event, and
receive, from the BS, a handover command for a handover of the terminal from the primary cell to a neighbor cell in response to the report of the second handover event,
wherein the signal strength of the primary cell is higher than the second threshold value.

17. The terminal of claim 16,
wherein the second measurement configuration is included in a first set of measurement configurations, and the first measurement configuration and the measurement configuration for the second handover event are included in a second set of measurement configurations,
wherein the first set and the second set are related to handover events comprising at least one of an event A1, an event A2, an event A3, or an event A5,
wherein the event A1 is a handover event which occurs when a signal strength of a serving cell of the terminal is greater than a threshold value included in a measurement configuration for the event A1,
wherein the event A2 is a handover event which occurs when a signal strength of a serving cell of the terminal is less than a threshold value included in a measurement configuration for the event A2,
wherein the event A3 is a handover event which occurs when a signal strength of an adjacent cell is greater than a signal strength of a serving cell of the terminal by a threshold offset value or more included in a measurement configuration for the event A3,
wherein the event A5 is a handover event which occurs when a signal strength of a serving cell of the terminal is less than a threshold value included in a measurement configuration for the event A5 and a signal strength of an adjacent cell is greater than another threshold value included in the measurement configuration for the event A5,
wherein each measurement configuration comprises at least one of measurement frequency information, handover event identification information, a threshold value, or an offset value, and
wherein a threshold value or an offset value in a measurement configuration of the second set is set as a value that is greater than or equal to that in a measurement configuration of the first set.

18. The terminal of claim 17,
wherein the first handover event is the event A2,
wherein the second handover event is the event A3, and
wherein the report of the event A3 is transmitted by the terminal if a signal strength of the neighbor cell is higher than the signal strength of the primary cell by an offset value in the measurement configuration for the second handover event or more.

19. The terminal of claim 17,
wherein the first handover event is the event A2,
wherein the second handover event is the event A5, and
wherein the report of the event A5 is transmitted by the terminal if a signal strength of the neighbor cell is greater than a threshold value in the measurement configuration for the second handover event and the signal strength of the primary cell is lower than another threshold value in the measurement configuration for the second handover event.

20. The terminal of claim 16, wherein the transceiver is further configured to receive, from the BS, a measurement configuration for detecting an event of a release of a connection from the secondary cell.

* * * * *